US012416957B2

(12) United States Patent
Teeter et al.

(10) Patent No.: US 12,416,957 B2
(45) Date of Patent: Sep. 16, 2025

(54) PoE POWER AGGREGATION SYSTEM

(71) Applicant: Dell Products L.P., Round Rock, TX (US)

(72) Inventors: Victor Teeter, Round Rock, TX (US); Shree Rathinasamy, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 18/240,082

(22) Filed: Aug. 30, 2023

(65) Prior Publication Data

US 2025/0076947 A1    Mar. 6, 2025

(51) Int. Cl.
| G06F 1/26 | (2006.01) |
| H02J 1/10 | (2006.01) |
| H04L 12/10 | (2006.01) |
| H04L 25/02 | (2006.01) |

(52) U.S. Cl.
CPC ............. *G06F 1/266* (2013.01); *H02J 1/10* (2013.01); *H04L 12/10* (2013.01); *H04L 25/02* (2013.01)

(58) Field of Classification Search
CPC ......... G06F 1/263; G06F 1/266; H04L 12/10; H04L 12/40045; H04L 25/02; H02J 1/10
See application file for complete search history.

(56) References Cited

U.S. PATENT DOCUMENTS

| 10,996,724 B2 * | 5/2021 | Koenen ............ H04L 12/10 |
| 11,729,008 B2 * | 8/2023 | Eghbal ............. G06F 1/266 |
| | | 713/300 |
| 11,764,982 B2 * | 9/2023 | Lin ................. G06F 1/263 |
| | | 713/300 |
| 12,124,305 B2 * | 10/2024 | Bhattacharyya ........ G06F 1/263 |
| 2006/0112288 A1 * | 5/2006 | Schindler ............. G06F 1/266 |
| | | 713/300 |
| 2007/0284946 A1 * | 12/2007 | Robbins ............... H02J 1/10 |
| | | 307/18 |
| 2009/0309420 A1 * | 12/2009 | Phan .................. H02J 1/10 |
| | | 307/43 |
| 2010/0153751 A1 * | 6/2010 | Tseng ............. H04L 12/40032 |
| | | 713/300 |
| 2013/0031378 A1 * | 1/2013 | Schindler .......... H04L 12/413 |
| | | 713/300 |
| 2015/0019884 A1 * | 1/2015 | Huff ................. H04L 12/10 |
| | | 713/300 |

(Continued)

*Primary Examiner* — Thomas J. Cleary

(74) *Attorney, Agent, or Firm* — Joseph Mencher

(57) ABSTRACT

A PoE power aggregation system includes a PoE power aggregation device coupling a powering device to a powered device. The PoE power aggregation device includes first and second powering device connectors coupled to first and second powering device ports on the powering device, respectively, and a powered device connector coupled to a powered device port on the powered device. The PoE power aggregation device receives data from the powering device via the first powering device connector, and transmits the data to the powered device through the powered device connector. The PoE power aggregation device also receives first and second power from the powering device via the first powering device connector and the second powering device connector, respectively, and transmits the first and second power to the powered device through the powered device connector along with the data.

20 Claims, 28 Drawing Sheets

(56) References Cited

U.S. PATENT DOCUMENTS

| | | | | |
|---|---|---|---|---|
| 2015/0127957 A1* | 5/2015 | Sethi | .................. | G06F 1/26 |
| | | | | 713/300 |
| 2015/0205336 A1* | 7/2015 | Walker | .................. | G06F 1/30 |
| | | | | 713/340 |
| 2016/0064938 A1* | 3/2016 | Balasubramanian | ... | H04L 12/10 |
| | | | | 307/11 |
| 2019/0179389 A1* | 6/2019 | Frick | .................. | G06F 1/28 |
| 2019/0182056 A1* | 6/2019 | Ramanujam | ............ | H04L 12/10 |
| 2019/0229934 A1* | 7/2019 | Zhuang | .................. | G06F 1/266 |
| 2019/0327101 A1* | 10/2019 | Picard | .................. | G06F 1/263 |
| 2021/0006420 A1* | 1/2021 | Neyland | ............. | G06F 11/3058 |
| 2021/0091966 A1* | 3/2021 | Roy | .................. | H04L 12/10 |
| 2023/0024116 A1* | 1/2023 | Rathinasamy | .......... | G06F 1/266 |

* cited by examiner

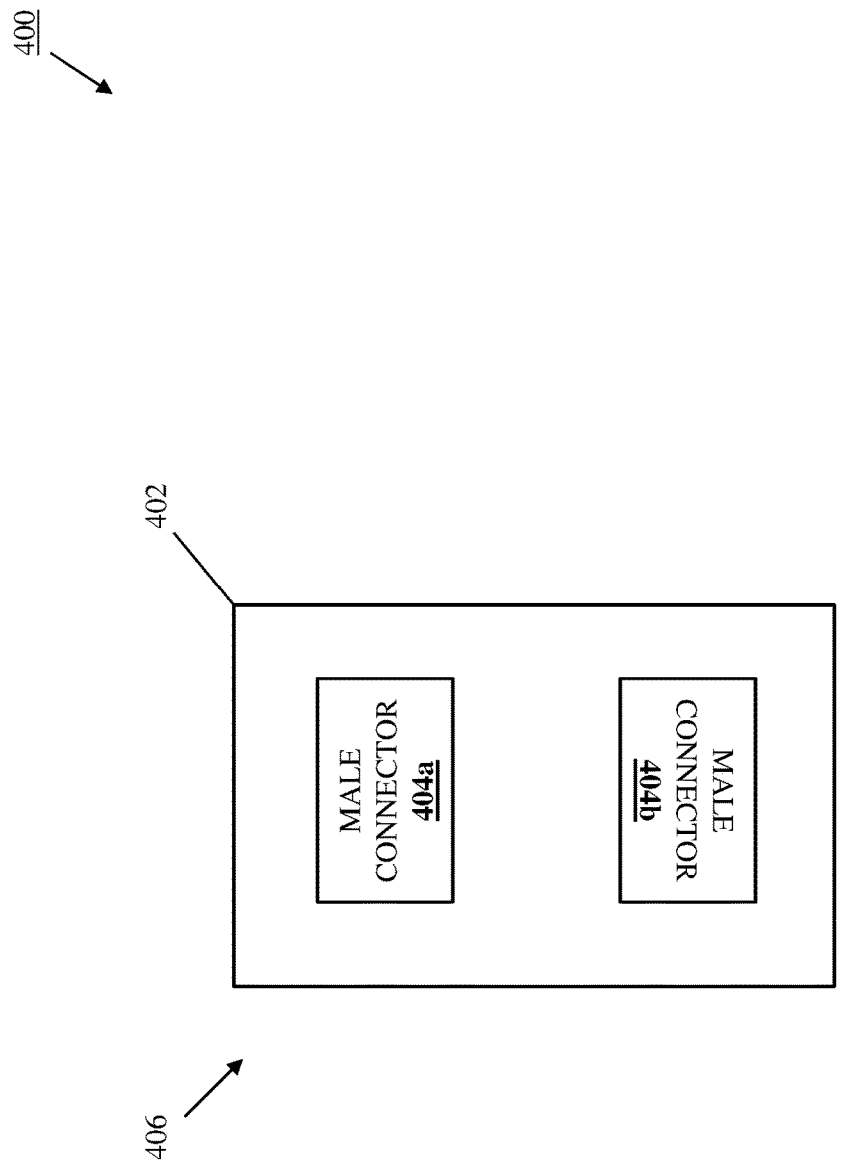

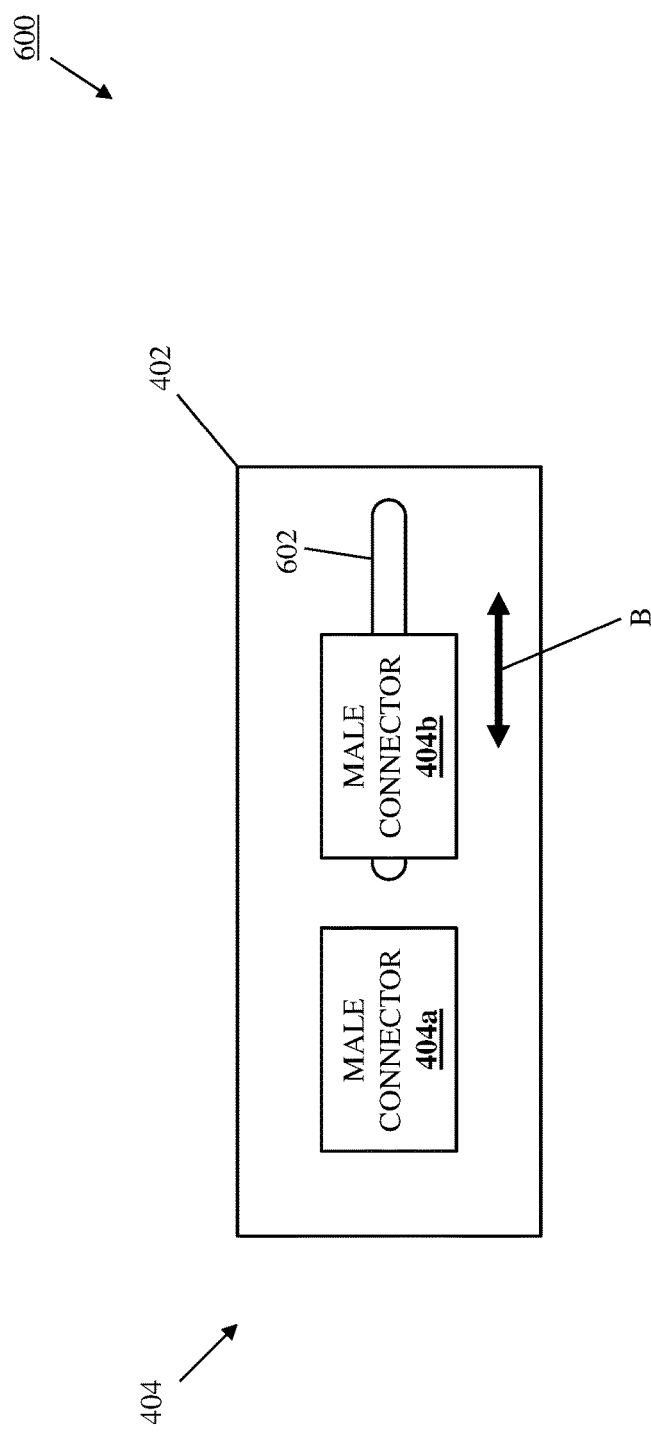

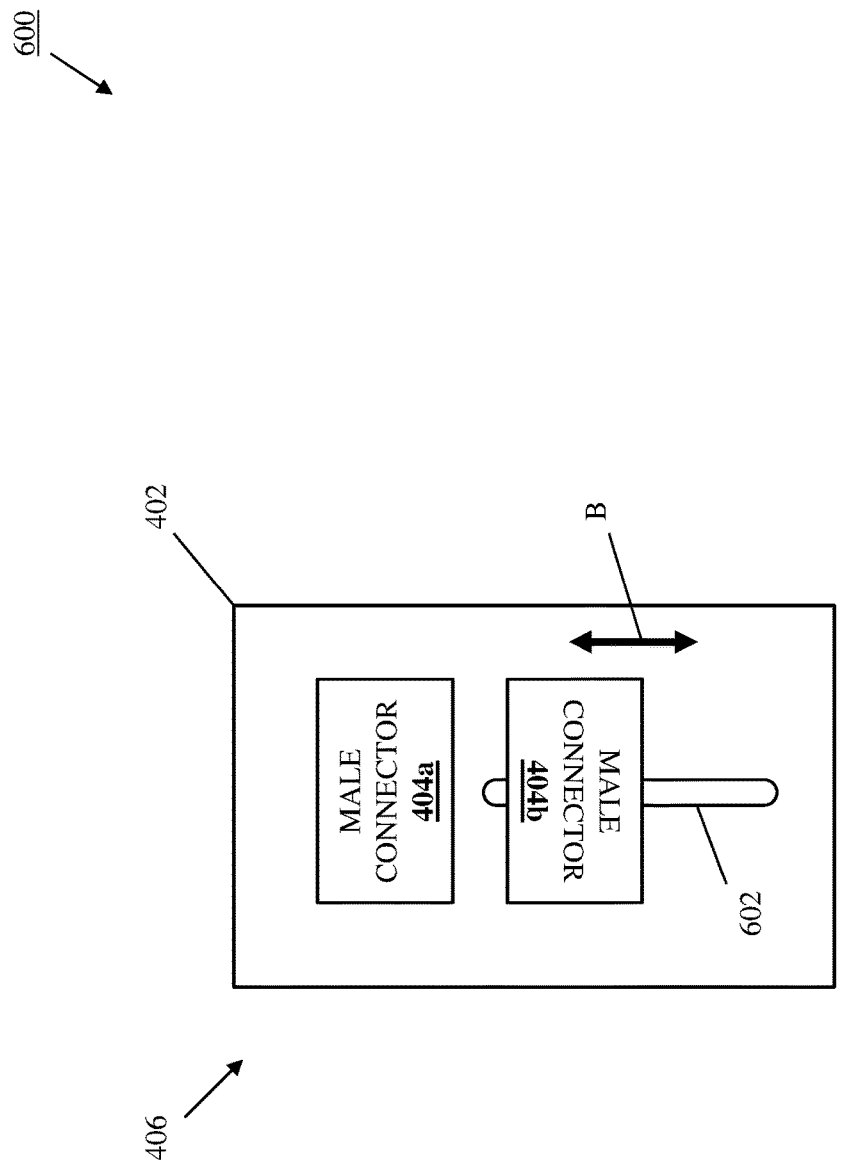

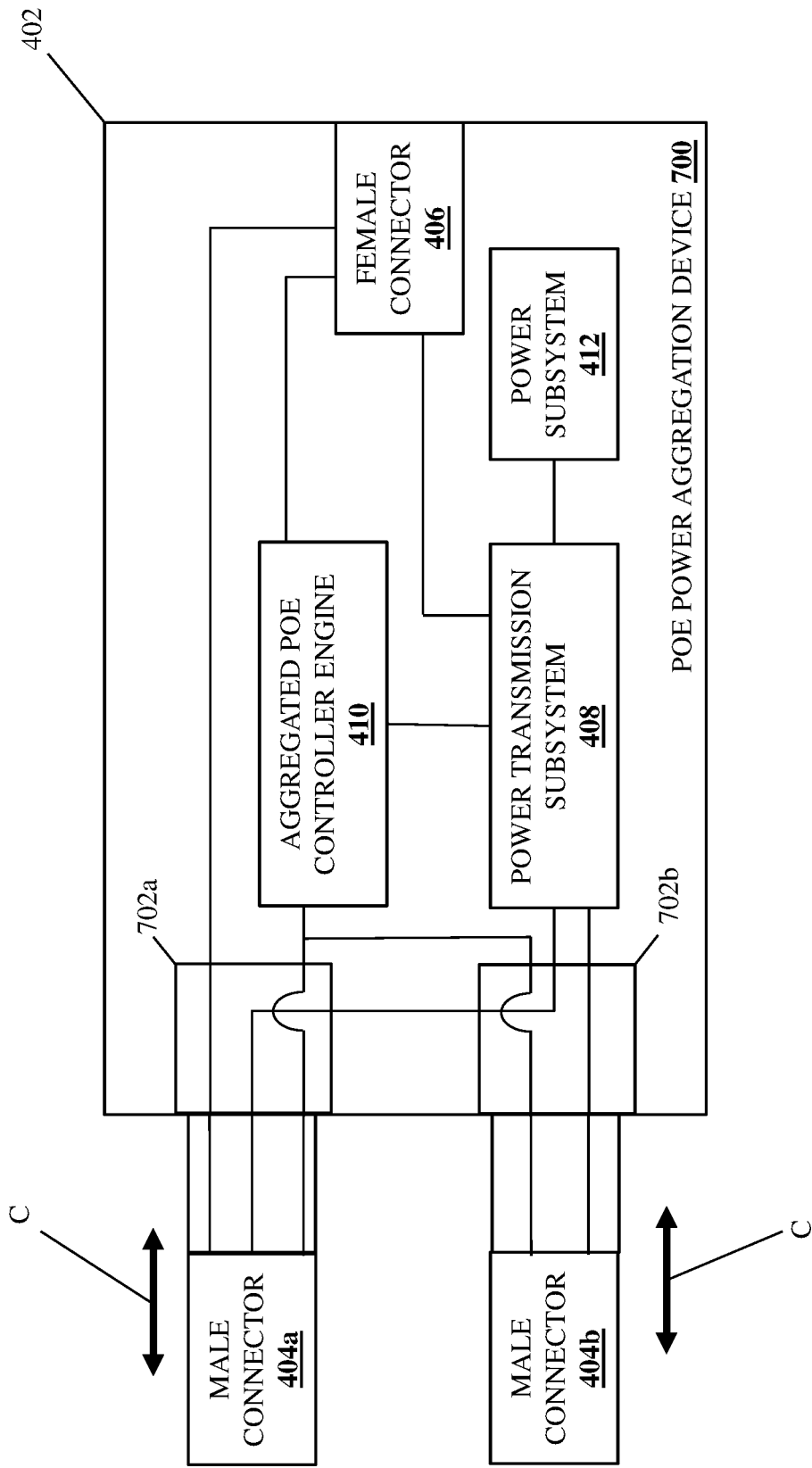

PoE POWER AGGREGATION SYSTEM

BACKGROUND

The present disclosure relates generally to information handling systems, and more particularly to powering a Power over Ethernet (PoE) powered device by aggregating power received from multiple ports on a powering information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as switch devices and/or other powering computing devices known in the art sometimes utilize Power over Ethernet (PoE) techniques to power powered devices connected to their ports via Ethernet cables. As will be appreciated by one of skill in the art in possession of the present disclosure, such PoE techniques allow electrical power to be transmitted by a powering computing device along with data signals over the same Ethernet cable to a powered device, and in specific examples may enable Internet of Things (IoT) devices and other network devices such as Internet Protocol (IP) cameras, wireless access points, and Voice over IP (VoIP) phones to receive power directly through a single Ethernet cable through which it sends and receives data. As such, the installation and management of such network devices is simplified by eliminating the need for separate power cabling and allowing power distribution to be centralized through the switch device, thus reducing cabling "clutter" and enabling relatively easier IoT/network device deployment, particularly in situations in which power outlets or other power sources are not available or abundant.

However, the power requirements of PoE powered devices continues to increase. For example, advanced PoE standards such as the PoE+ standard described in Institute of Electrical and Electronics Engineers (IEEE) 802.3at and the Universal PoE (UPoE) standard described in IEEE 802.3bt have been developed to deliver levels of electrical power that are higher than those available using conventional PoE standards like those described in IEEE 802.3af, and that are designed to support a wider range of powered devices that require additional power for enhanced performance, features, and/or functionality by providing 30 watts, 60 watts, or more power via an Ethernet cable (e.g., as opposed to the 15.4 watts of power available via the conventional PoE standards described above). As such, switch devices and/or other powering devices operating according to conventional PoE standards may be unable to power (or properly power) powered devices operating according to the PoE+ or UPoE standards discussed above, resulting in increased costs for users that wish to implement such powered devices in their networks and thus must purchase new switch/powering devices, or inhibiting the adoption of such powered devices by such users.

Accordingly, it would be desirable to provide a PoE power provisioning system that addresses the issues discussed above.

SUMMARY

According to one embodiment, a Power over Ethernet (PoE) power aggregation device includes a chassis; a first powering device connector that is included on the chassis; a second powering device connector that is included on the chassis; a powered device connector that is included on the chassis; a data transmission subsystem that is included in the chassis and coupled to the first powering device connector and the first powered device connector, wherein the data transmission subsystem is configured to: receive data from a powering device through the first powering device connector; and transmit the data to a powered device through the powered device connector; and a power transmission subsystem that is included in the chassis and coupled to the first powering device connector, the second powering device connector, and the first powered device connector, wherein the power transmission subsystem is configured to: receive first power from the powering device through the first powering device connector; receive second power from the powering device through the second powering device connector; and transmit the first power and the second power to the powered device through the powered device connector along with the data.

BRIEF DESCRIPTION OF THE DRAWINGS

FIG. 4C is a schematic front view illustrating another embodiment of the PoE power aggregation device of FIG. 4A.

FIG. 6D is a schematic front view illustrating an embodiment of the second powering device connector configuration of the PoE power aggregation device of FIG. 6B.

FIG. 6F is a schematic front view illustrating an embodiment of the second powering device connector configuration of the PoE power aggregation device of FIG. 6B.

FIG. 7B is a schematic front view illustrating an embodiment of the PoE power aggregation device of FIG. 7A with reconfigurable powering device connectors provided in a second powering device connector configuration.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
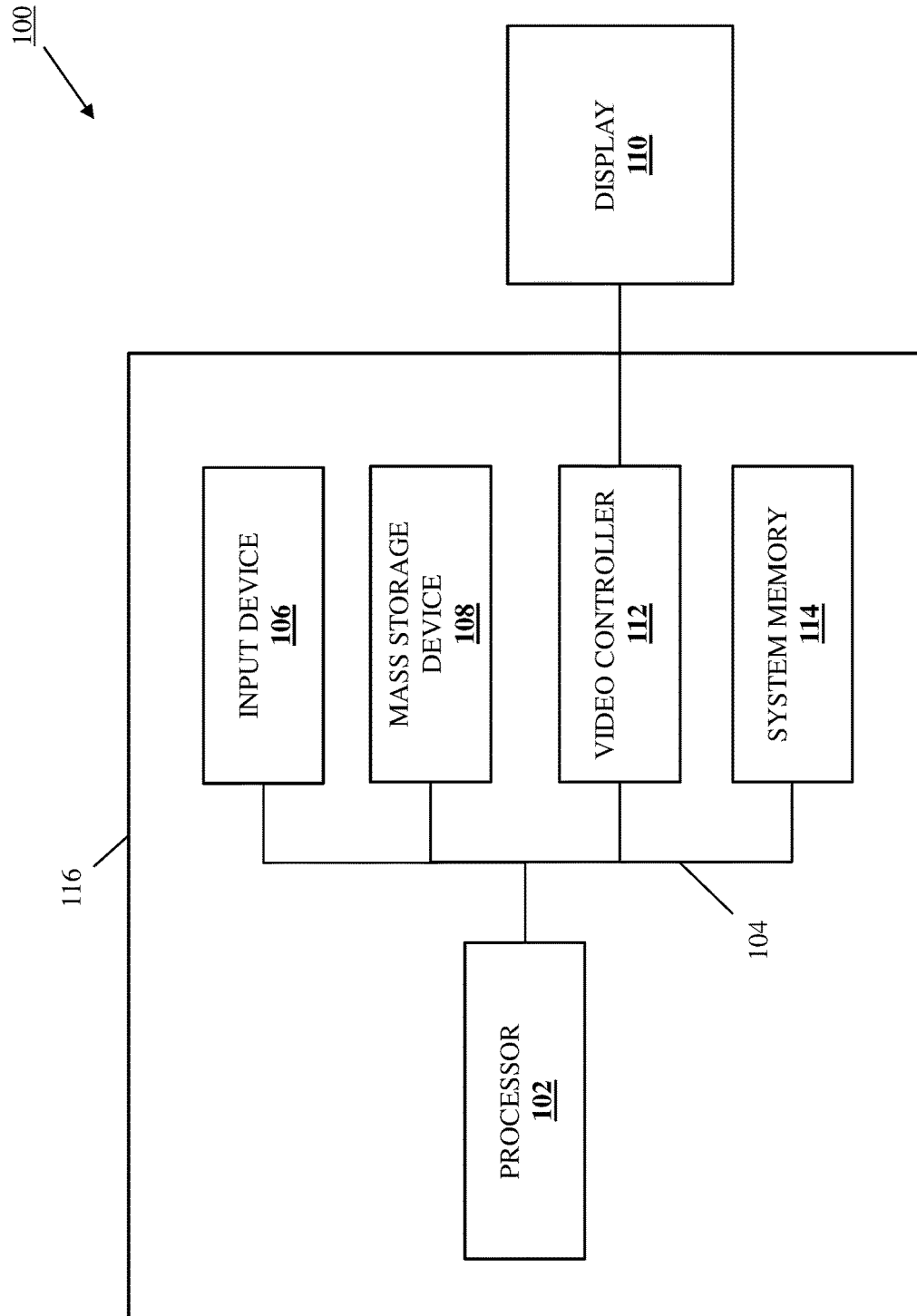
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
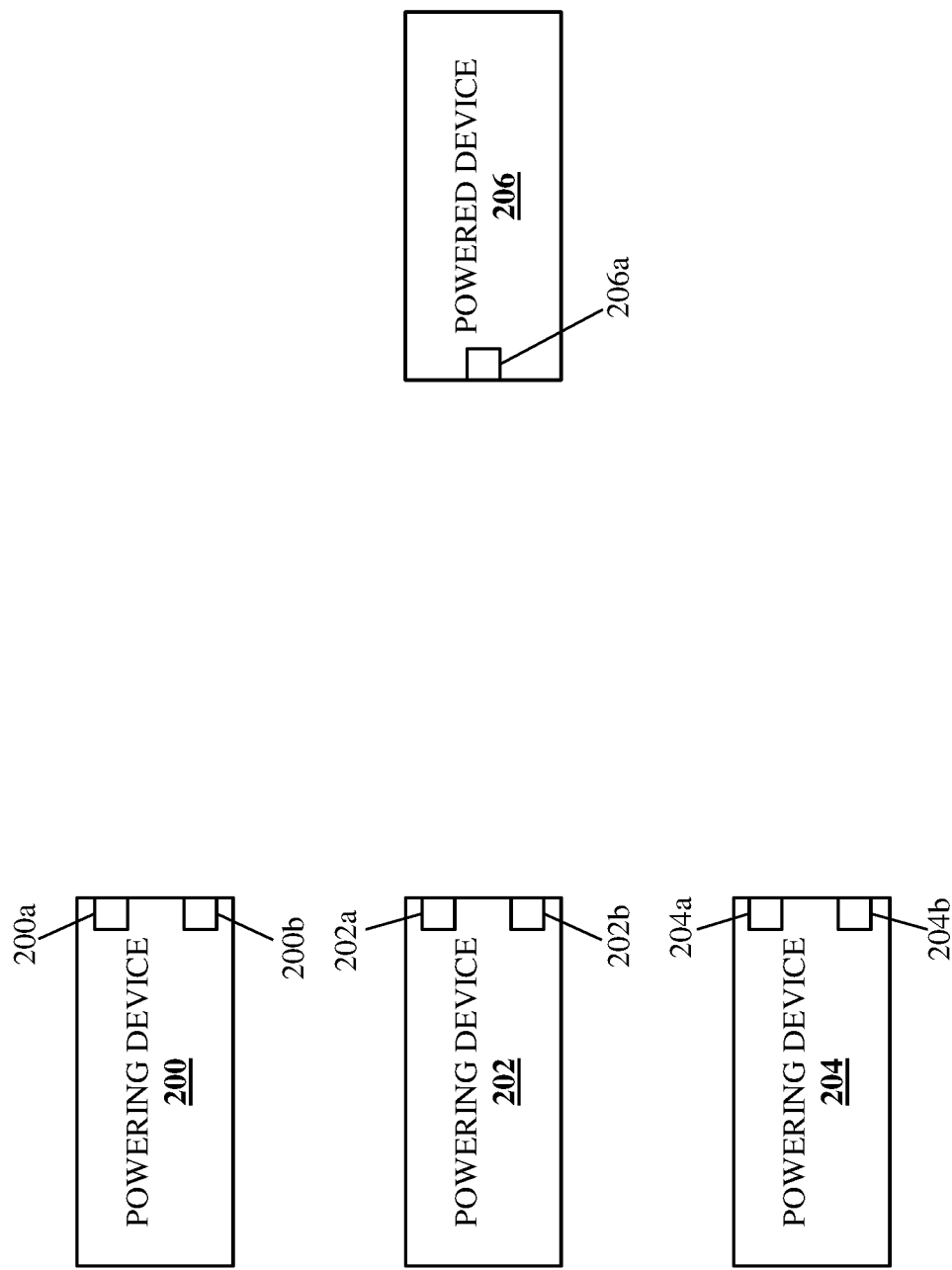
FIG. 2 is a schematic view illustrating an embodiment of powering devices and a powered device that may be included in a networked system that may provide the PoE power aggregation system of the present disclosure.

Referring now to FIG. 2, an embodiment of a powering devices and a powered device that may be included in a networked system that may provide the PoE power aggregation system of the present disclosure are illustrated. In the illustrated embodiment, a plurality of powering devices 200, 202, and up to 204 may be included in the networked system that provides the PoE power aggregation system of the present disclosure, and any or each of the powering devices 200-204 may be provided by the IHS 100 discussed above with reference to FIG. 1, and/or may include some or all of the components of the IHS 100. One of skill in the art in possession of the present disclosure will recognize that the specific examples provided below describe the powering devices 202-206 as being provided by switch devices, but will recognize that powering devices provided in the PoE power aggregation system of the present disclosure may include any powering devices (e.g., server devices, storage systems, and/or other computing devices that would be apparent to one of skill in the art in possession of the present disclosure) that may be configured to operate similarly as the powering devices 200-204 discussed below.

In the illustrated embodiment, each of the powering devices 200, 202, and up to 204 includes a plurality of powering device ports 200a-200b, 202a-202b, and up to 204a-204b, respectively, and while only two powering device ports are illustrated as being included on each of the powering devices 200-204 for the purposes of the specific examples described below, one of skill in the art in possession of the present disclosure in the art in possession of the present disclosure will appreciate how the powering devices may include many more powering device ports while remaining within the scope of the present disclosure as well. As discussed below, the powering device ports may be provided by Ethernet ports (e.g., female Ethernet ports), although other powering devices ports are envisioned as falling within the scope of the present disclosure as well.

In the illustrated embodiment, a powered device 206 may also be included in the networked system that provides the PoE power aggregation system of the present disclosure, and may be provided by the IHS 100 discussed above with reference to FIG. 1, and/or may include some or all of the components of the IHS 100. One of skill in the art in possession of the present disclosure will recognize that the specific examples provided below describe the powered device 206 as being provided by IP cameras, wireless access points, and VoIP phones, and/or other IoT/network devices known in the art, but will recognize that powered devices provided in the PoE power aggregation system of the present disclosure may include any powered devices that may be configured to operate similarly as the powered device 206 discussed below. In the illustrated embodiment, the powered device 206 includes a powered device port 206a. As discussed below, the powered device port may be provided by an Ethernet port (e.g., female Ethernet port), although other powered devices ports are envisioned as falling within the scope of the present disclosure as well. However, while a specific example of components in a networked system that provides the PoE power aggregation system of the present disclosure have been illustrated and described, one of skill in the art in possession of the present disclosure will recognize that the PoE power aggregation system of the present disclosure may include a variety of components and component configurations while remaining within the scope of the present disclosure as well.

Figure 3:
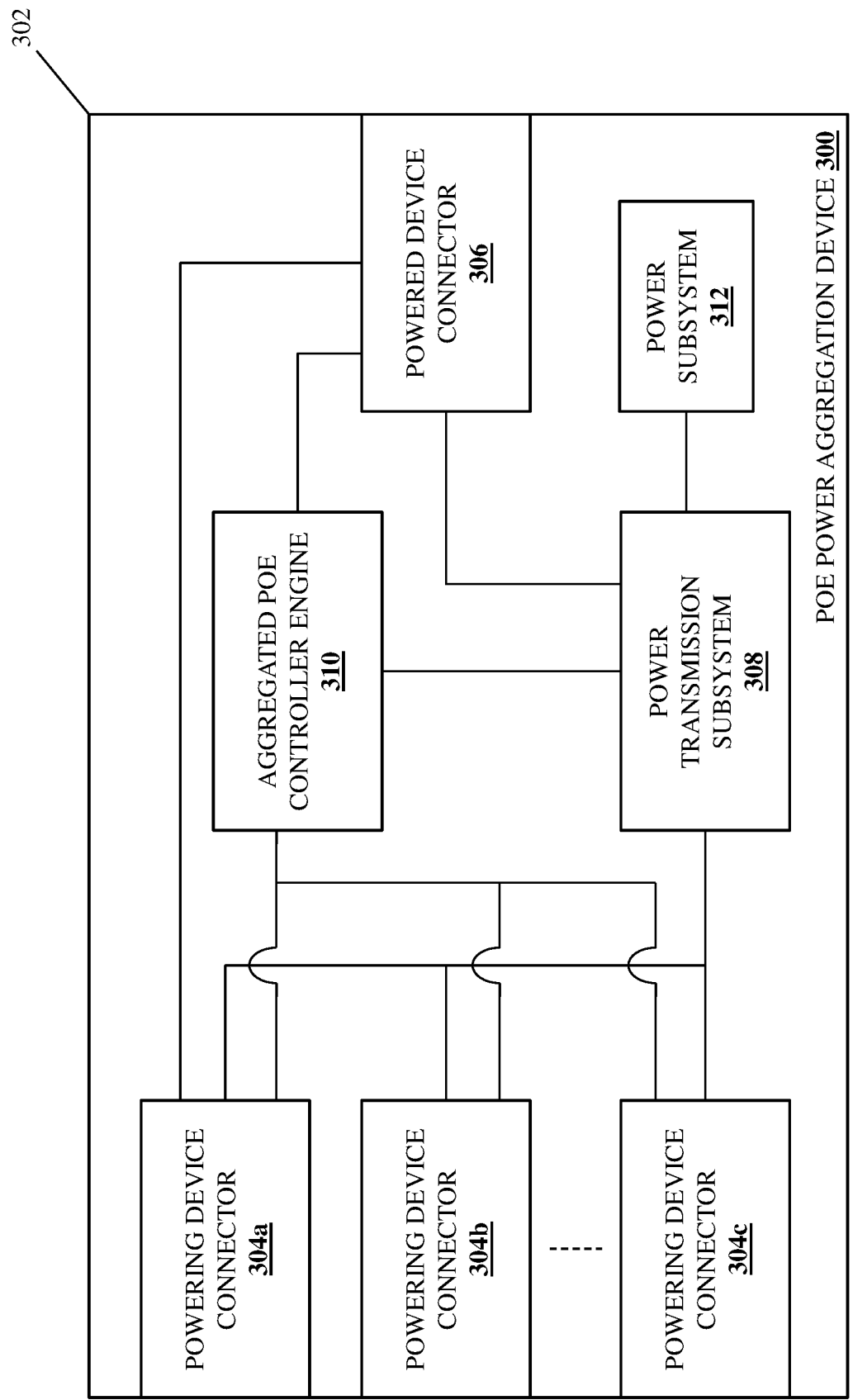
FIG. 3 is a schematic view illustrating an embodiment of a PoE power aggregation device that may be included in a networked system that may provide the PoE power aggregation system of the present disclosure.

Referring now to FIG. 3, an embodiment of a PoE power aggregation device 300 is illustrated that may couple any of the powering devices 200a-200c to the powered device 202 discussed above with reference to FIG. 2. In the illustrated embodiment, the PoE power aggregation device 300 includes a chassis 302 that houses the components of the PoE power aggregation device 300, only some of which are illustrated and described below. For example, the chassis 302 may include a plurality of powering device connectors 304a, 304b, and up to 304c. To provide some specific examples, two powering device connectors may be provided on the PoE power aggregation device 300 to configure the PoE power aggregation device 300 to allow a conventional PoE powering device to power some PoE+ powered devices (or configure the PoE power aggregation device 300 to allow a PoE+ powering device to power some UPoE powered devices), and three powering device connectors may be provided on the PoE power aggregation device 300 to configure the PoE power aggregation device 300 to allow a conventional PoE powering device to power some UPoE powered devices.

However, while specific numbers of powering device connectors have been described, one of skill in the art in possession of the present disclosure will appreciate how different numbers of powering device connectors may be provided on the PoE power aggregation device 300 to allow a variety of powering devices to power powered devices that require more power than is available by any one port on those powering devices while remaining within the scope of the present disclosure as well. In many of the embodiments discussed below, the powering device connectors 304a-304c are provided by Ethernet connectors, although one of skill in the art in possession of the present disclosure will appreciate how other types of powering device connectors may enable the teachings of the present disclosure and thus are envisioned as falling within its scope as well.

Furthermore, the chassis 302 may also include a powered device connector 306 that is coupled to the powering device connector 304a, and one of skill in the art in possession of the present disclosure will appreciate how the coupling between the powered device connector 306 and the powering device connector 304a may be provided by cabling, traces in a circuit board that supports the powered device connector 306 and the powering device connector 304a, and/or other data communication subsystems that may operate as a data "passthrough" to allow data received at the powering device connector 304a to be transmitted via the powered device connector 306 as described in further detail below.

However, while described as providing a data "passthrough", one of skill in the art in possession of the present disclosure will appreciate how the data communication subsystem that couples the powered device connector 306 to the powering device connector 304a may include processing elements for processing the data received at the powering device connector 304a and transmitted via the powered device connector 306 while remaining within the scope of the present disclosure as well. Furthermore, while the embodiments illustrated and discussed below only describe the data communication subsystem coupling the powered device connector 306 to the powering device connector 304a, other embodiments may include the data communication subsystem coupling the powered device connector 306 to any or all of the powering device connectors 304b-304c as well while remaining within the scope of the present disclosure as well.

In many of the embodiments discussed below, the powered device connector 306 is provided by an Ethernet connector, although one of skill in the art in possession of the present disclosure will appreciate how other types of powered device connectors may enable the teachings of the present disclosure and thus are envisioned as falling within its scope as well. Furthermore, while only a single powered device connector 306 is illustrated in FIG. 3 and discussed in many of the embodiments detailed below, one of skill in the art in possession of the present disclosure will appreciate how the chassis may include additional powered device connectors that operate similarly to the powered device connector 306 described below while remaining within the scope of the present disclosure as well.

In the illustrated embodiment, the chassis 302 also houses a power transmission subsystem 308 that is coupled to each of the powering device connectors 304a-304c, as well as to the powered device connector 306. In an embodiment, the power transmission subsystem 308 may be provided by an integrated circuit device, a power combiner device, a Direct-Current-to-Direct-Current (DC-to-DC) converter device, and/or other devices that one of skill in the art in possession of the present disclosure will recognize may be configured to aggregate power received from any combination of the powering device connectors 304a-304c as described below. Furthermore, in some embodiments a parallel power circuit may be provided using transformers (e.g., to combine power from multiple powering device ports), diodes (e.g., to prevent current from flowing back to an power input), capacitors (e.g., to filter out noise), resistors (e.g., to load balance power and serve power to the powered device), and/or other power handling components that would be apparent to one of skill in the art in possession of the present disclosure. However, while described as being provided by particular devices, one of skill in the art in possession of the present disclosure will appreciate how the power transmission subsystem 308 may be provided using a variety of power transmission components that are configured to perform the power transmission functionality described below while remaining within the scope of the present disclosure as well.

In some embodiments, the chassis 302 may house a processing system (not illustrated, but which may be similar to the processor 102 discussed above with reference to FIG. 1) and a memory system (not illustrated, but which may be similar to the memory 114 discussed above with reference to FIG. 1) that is coupled to the processing system and that includes instructions that, when executed by the processing system, cause the processing system to provide an aggregated PoE controller engine 310 that is configured to perform the functionality of the aggregated PoE controller engines, aggregated PoE controller subsystems, and/or PoE power aggregation devices discussed below. However, while the aggregated PoE controller engine 310 is illustrated and described below as being included in the PoE power aggregation device 300 and configured to perform powering device configuration operations, power negotiation operations, and/or other PoE controller operations that would be apparent to one of skill in the art in possession of the present disclosure, other embodiments of the present disclosure may omit the aggregated PoE controller engine 310 from the PoE power aggregation device 300, with the powering device configuration operations performed by a user, and the power negotiation operations and other PoE controller operations performed by the powering device and powered device via the PoE power aggregation device 300 (e.g., using the data "passthrough" provided by the PoE power aggregation device 300), as described in further detail below.

As illustrated, in embodiments in which the aggregated PoE controller engine 310 is included in the PoE power aggregation device 300, the aggregated PoE controller engine 310 may be coupled to each of the powering device connectors 304a-304c (e.g., via a coupling between each of the powering device connectors 304a-304c and the processing system discussed above), the power transmission subsystem 308 (e.g., via a coupling between the powering transmission subsystem 308 and the processing system discussed above), and the powered device connector 306 (e.g., via a coupling between the powered device connector 306 and the processing system discussed above). Furthermore, the chassis 302 may also house a power subsystem 312 that is coupled to the power transmission subsystem 308, and that may be coupled to any of the PoE power aggregation components in the PoE power aggregation device 300 and configured to receive power from the power transmission subsystem 308 and provide that power to those PoE power aggregation components in order to enable the PoE power aggregation functionality described above. However, while a specific PoE power aggregation device 300 has been illustrated and described, one of skill in the art in possession of the present disclosure will recognize that PoE power aggregation devices (or other devices operating according to the teachings of the present disclosure in a manner similar to that described below for the PoE power aggregation device 300) may include a variety of components and/or component configurations for providing conventional device functionality, as well as the PoE power aggregation functionality discussed below, while remaining within the scope of the present disclosure as well.

Figure 4A:
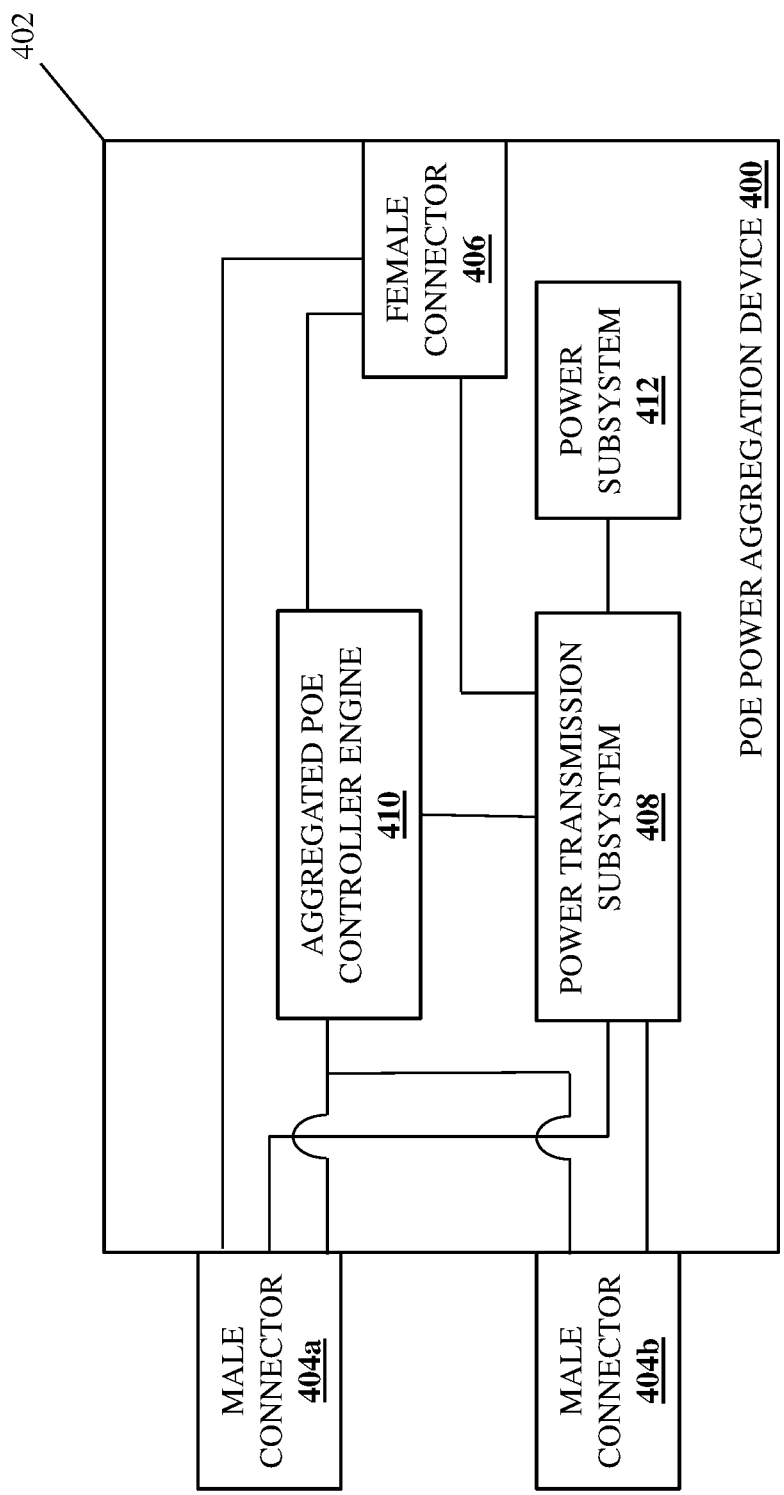
FIG. 4A is a schematic view illustrating an embodiment of the PoE power aggregation device of FIG. 3.

With reference to FIG. 4A, a specific embodiment of a PoE power aggregation device 400 is illustrated that may provide the PoE power aggregation device 300 discussed above with reference to FIG. 3. In the illustrated embodiment, the PoE power aggregation device 400 includes a chassis 402 that houses the components of the PoE power aggregation device 400, only some of which are illustrated and described below. The chassis 402 includes a pair of male connectors 404a and 404b that provide a specific example of the plurality of powering device connectors 304a-304c discussed above with reference to FIG. 3 and that, as discussed below, may configure the PoE power aggregation device 400 to allow a conventional PoE powering device to power some PoE+ powered devices, or configure the PoE power aggregation device 400 to allow a PoE+ powering device to power some UPoE powered devices. In many of the embodiments discussed below, the powering device connectors 404a and 404b are provided by Ethernet connectors, although one of skill in the art in possession of the present disclosure will appreciate how other types of male connectors may enable the teachings of the present disclosure and thus are envisioned as falling within its scope as well.

Furthermore, the chassis 402 also includes a female connector 406 that provides a specific example of the powered device connector discussed above with reference to FIG. 3, with the female connector 406 coupled to the male connector 404a by cabling, traces in a circuit board that supports the female connector 406 and the male connector 404a, and/or other data communication subsystems that may operate as a data "passthrough" to allow data received at the male connector 404a to be transmitted via the female connector 406. However, similarly as discussed above, while described as providing a data "passthrough", one of skill in the art in possession of the present disclosure will appreciate how the data communication subsystem that couples the female connector 406 to the male connector 404a may include processing elements for processing the data received at the male connector 404a and transmitted via the female connector 406 while remaining within the scope of the present disclosure as well. Furthermore, while the embodiments illustrated and discussed below only describe the data communication subsystem coupling the female connector 406 to the male connector 404a, other embodiments may include the data communication subsystem coupling the female connector 406 to any or all of the male connectors 404a and 404b while remaining within the scope of the present disclosure as well. In many of the embodiments discussed below, the female connector 406 is provided by an Ethernet connector, although one of skill in the art in possession of the present disclosure will appreciate how other types of female connectors may enable the teachings of the present disclosure and thus are envisioned as falling within its scope as well.

In the illustrated embodiment, the chassis 402 also houses a power transmission subsystem 408 that is coupled to each of the male connectors 404a and 404b, as well as to the female connector 406. Similarly as discussed above, the power transmission subsystem 408 may be provided by an integrated circuit device, a power combiner device, a DC-to-DC converter device, and/or other devices that one of skill in the art in possession of the present disclosure will recognize may be configured to aggregate power received from any combination of the powering device connectors 304a-304c as described below. As also described above, in some embodiments a parallel power circuit may be provided using transformers (e.g., to combine power from multiple powering device ports), diodes (e.g., to prevent current from flowing back to an power input), capacitors (e.g., to filter out noise), resistors (e.g., to load balance power and serve power to the powered device), and/or other power handling components known in the art. However, while described as being provided by particular devices, one of skill in the art in possession of the present disclosure will appreciate how the power transmission subsystem 408 may be provided using a variety of power transmission components that are configured to perform the power transmission functionality described below while remaining within the scope of the present disclosure as well.

In some embodiments, the chassis 402 may house a processing system (not illustrated, but which may be similar to the processor 102 discussed above with reference to FIG. 1) and a memory system (not illustrated, but which may be similar to the memory 114 discussed above with reference to FIG. 1) that is coupled to the processing system and that includes instructions that, when executed by the processing system, cause the processing system to provide an aggregated PoE controller engine 410 that is configured to perform the functionality of the aggregated PoE controller engines, aggregated PoE controller subsystems, and/or PoE power aggregation devices discussed below. However, while the aggregated PoE controller engine 410 is illustrated and described below as being included in the PoE power aggregation device 400 and configured to perform powering device configuration operations, power negotiation operations, and/or other PoE controller operations that would be apparent to one of skill in the art in possession of the present disclosure, other embodiments of the present disclosure may omit the aggregated PoE controller engine 410 from the PoE power aggregation device 400, with the powering device configuration operations performed by a user, and the power negotiation operations and other PoE controller operations performed by the powering device and powered device via the PoE power aggregation device 400 (e.g., using the data "passthrough" provided by the PoE power aggregation device 400), as described in further detail below.

As illustrated, in embodiments that include the aggregated PoE controller engine 410, the aggregated PoE controller engine 410 may be coupled to each of the male connectors 404a and 404b (e.g., via a coupling between each of the male connectors 404a and 404b and the processing system discussed above), the power transmission subsystem 408 (e.g., via a coupling between the powering transmission subsystem 408 and the processing system discussed above), and the female connector 406 (e.g., via a coupling between the female connector 406 and the processing system discussed above). Furthermore, the chassis 402 may also house a power subsystem 412 that is coupled to the power transmission subsystem 408, and that may be coupled to any of the PoE power aggregation components in the PoE power aggregation device 400 and configured to receive power from the power transmission subsystem 408 and provide that power to those PoE power aggregation components in order to enable the PoE power aggregation functionality described above.

Figure 4B:
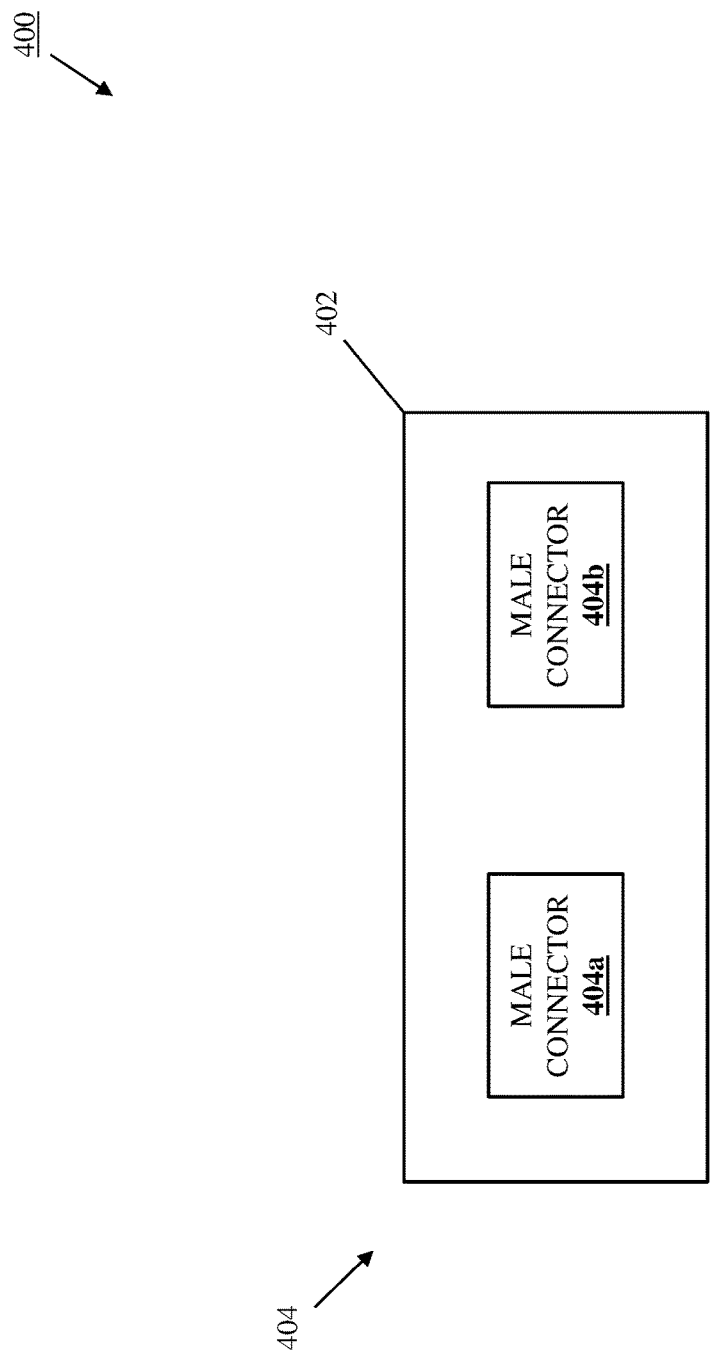
FIG. 4B is a schematic front view illustrating an embodiment of the PoE power aggregation device of FIG. 4A.

With reference to FIG. 4B, a specific example of the PoE power aggregation device 400 is illustrated that provides the male connectors 404a and 404b on the chassis 402 in a "side-by-side" orientation 404 that one of skill in the art in possession of the present disclosure will appreciate may be configured to allow the male connectors 404a and 404b to be connected to corresponding powering device ports on a powering device that are provided in the same row (e.g., a "top" row of powering device ports or a "bottom" row of powering device ports on that powering device). With reference to FIG. 4C, another specific example of the PoE power aggregation device 400 is illustrated that provides the male connectors 404a and 404b on the chassis 402 in a "stacked" orientation 406 with the male connector 404b inverted relative to the male connector 404a, which one of skill in the art in possession of the present disclosure will appreciate may be configured to allow the male connectors 404a and 404b to be connected to corresponding powering device ports on a powering device that are provided in different adjacent rows (e.g., a "top" row of powering device ports, and a "bottom" row of powering device ports on that powering device that are inverted relative to the "top" row of powering device ports).

Furthermore, while the embodiment of FIG. 4C includes the male connector 404b inverted relative to the male connector 404a, one of skill in the art in possession of the present disclosure will appreciate that the male connector 404b need not be inverted relative to the male connector 404a when the PoE power aggregation device 400 is configured for use with powering devices that do not invert their "bottom" row of powering device ports as described above. However, while specific examples of the PoE power aggregation device 400 have been illustrated and described, one of skill in the art in possession of the present disclosure will recognize that PoE power aggregation devices (or other devices operating according to the teachings of the present disclosure in a manner similar to that described below for the PoE power aggregation device 400) may include a variety of components and/or component configurations for providing conventional device functionality, as well as the PoE power aggregation functionality discussed below, while remaining within the scope of the present disclosure as well.

Figure 5A:
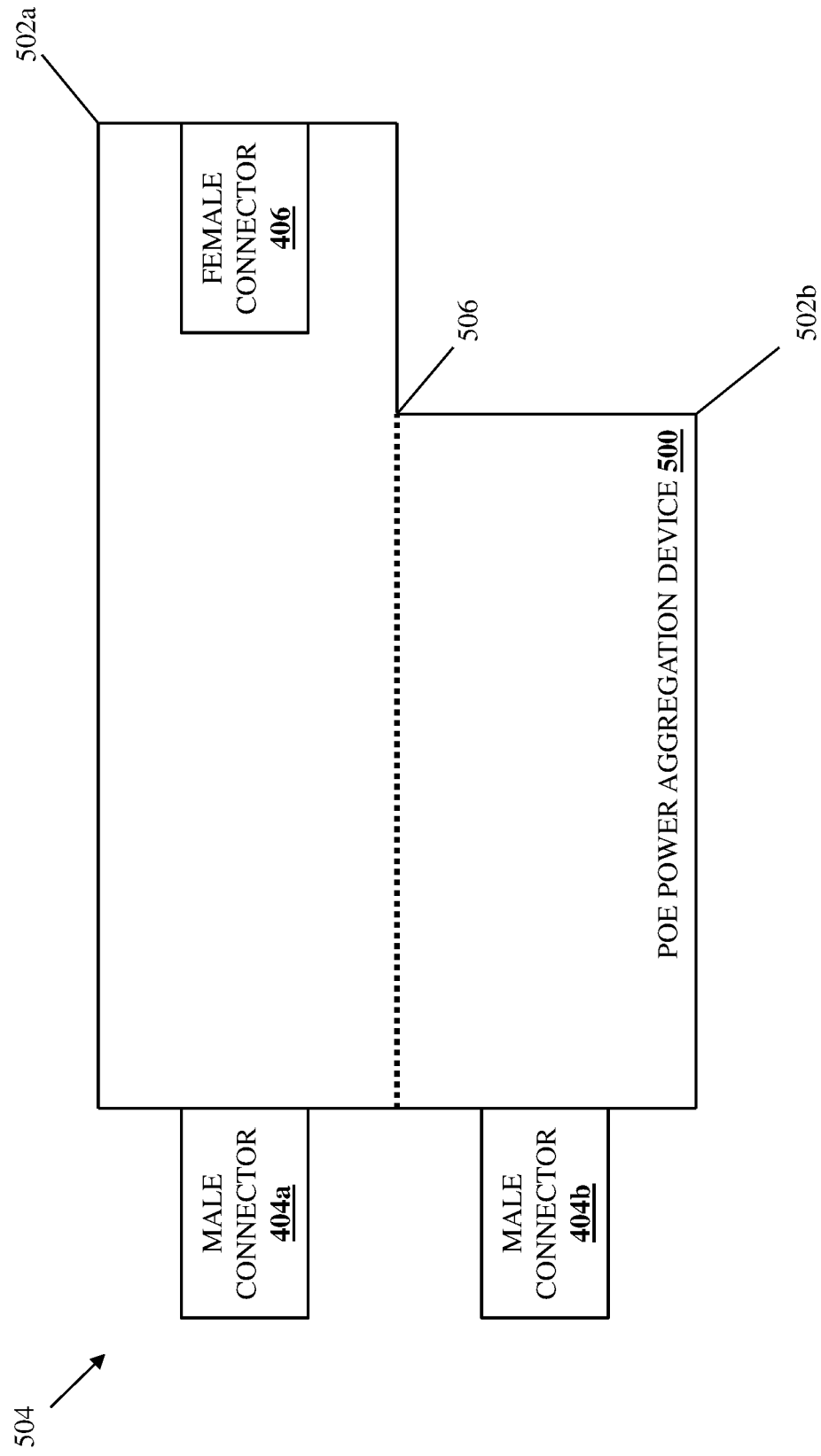
FIG. 5A is a schematic top view illustrating an embodiment of the PoE power aggregation device of FIG. 4A with a first powering device connector configuration.
Figure 5B:
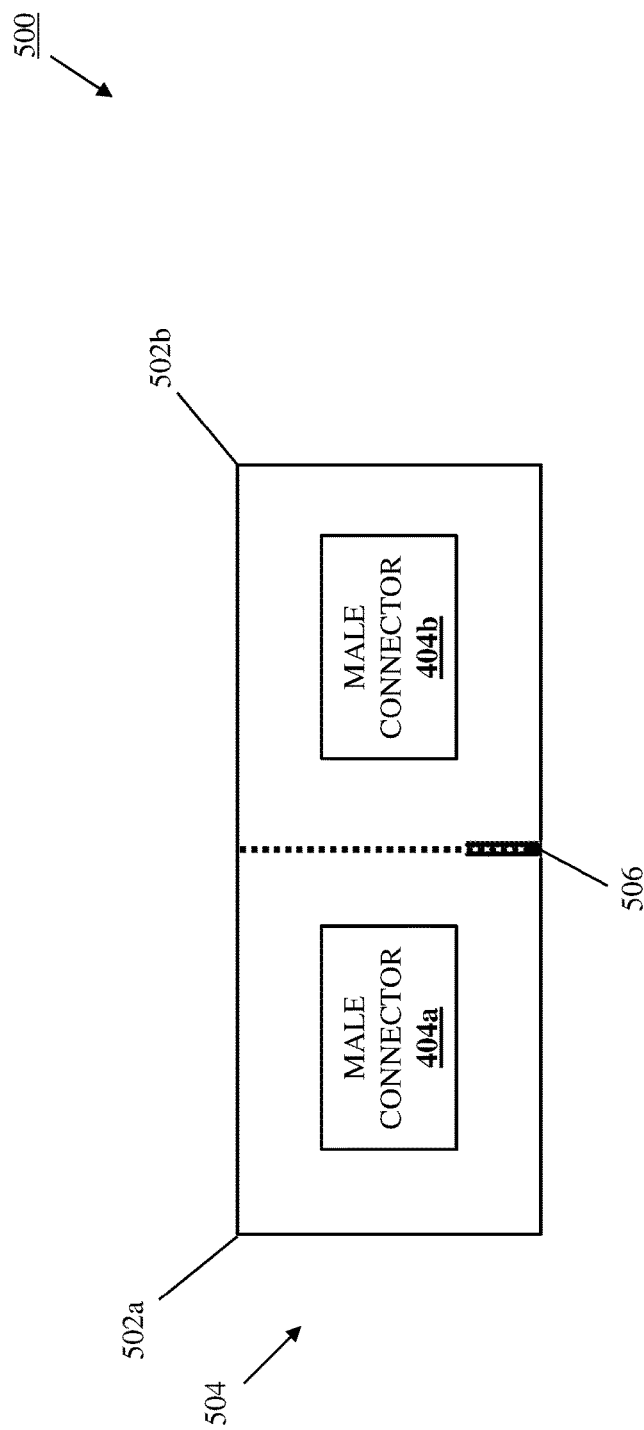
FIG. 5B is a schematic front view illustrating an embodiment of the PoE power aggregation device of FIG. 5A with the first powering device connector configuration.

With reference to FIGS. 5A, 5B, 5C, and 5D, an embodiment of a PoE power aggregation device 500 is illustrated that provides a specific example of the PoE power aggregation device 400 discussed above with reference to FIG. 4A with configurable powering device connectors, and similar components in the PoE power aggregation devices 400 and 500 have been provided with the same reference numbers. The PoE power aggregation device 500 includes a first chassis portion 502a and a second chassis portion 502b that replace the chassis 402 discussed above with reference to FIG. 4A, with the first chassis portion 502a including the male connector 404a and the female connector 410, and the second chassis portion 502b including the male connector 404b. With reference to FIGS. 5A and 5B, the PoE power aggregation device 500 is illustrated in first powering device connector configuration that provides the male connectors 404a and 404b in a "side-by-side" orientation 504 that one of skill in the art in possession of the present disclosure will appreciate may be configured to allow the male connectors 404a and 404b to be connected to corresponding powering device ports on a powering device that are provided in the same row (e.g., a "top" row of powering device ports or a "bottom" row of powering device ports on that powering device).

Furthermore, the first chassis portion 502a is movably coupled to the second chassis portion 502b by a moveable coupling 506 such as the hinge illustrated and discussed below, or other movable coupling that one of skill in the art in possession of the present disclosure would recognize as providing the powering device connector reconfiguration functionality described below. As will be appreciated by one of skill in the art in possession of the present disclosure, a ribbon cable or other data conduits may be provided between the first chassis portion 502a and the second chassis portion 502b to provide the couplings between the components of the PoE power aggregation device 500 that are included in the first chassis portion 502a, and the components of the PoE power aggregation device 500 that are included in the second chassis portion 502b, while also allowing the relative movement of the first chassis portion 502a and the second chassis portion 502b described below.

Figure 5C:
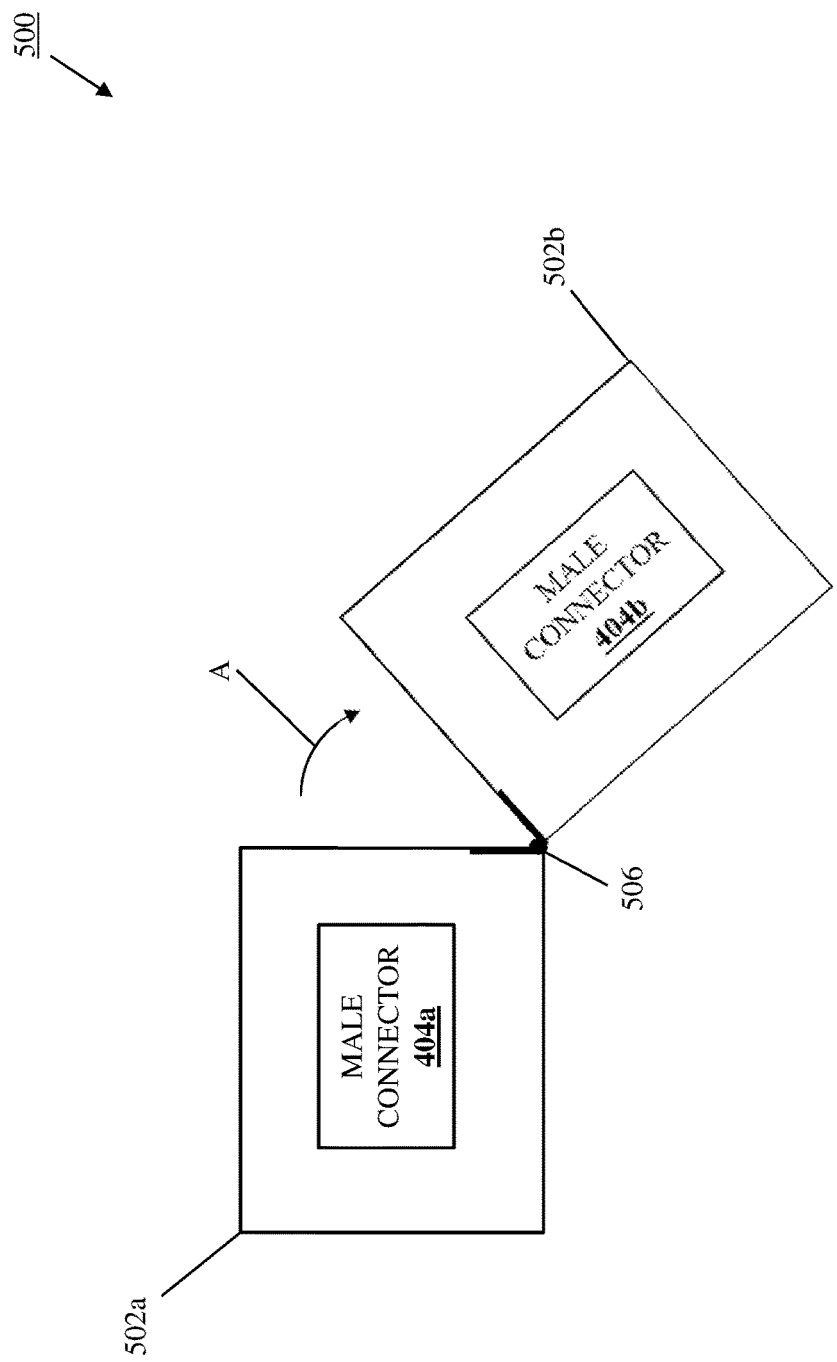
FIG. 5C is a schematic front view illustrating an embodiment of the PoE power aggregation device of FIG. 5A having its connector configuration changed from the first powering device connector configuration to a second powering device connector configuration.
Figure 5D:
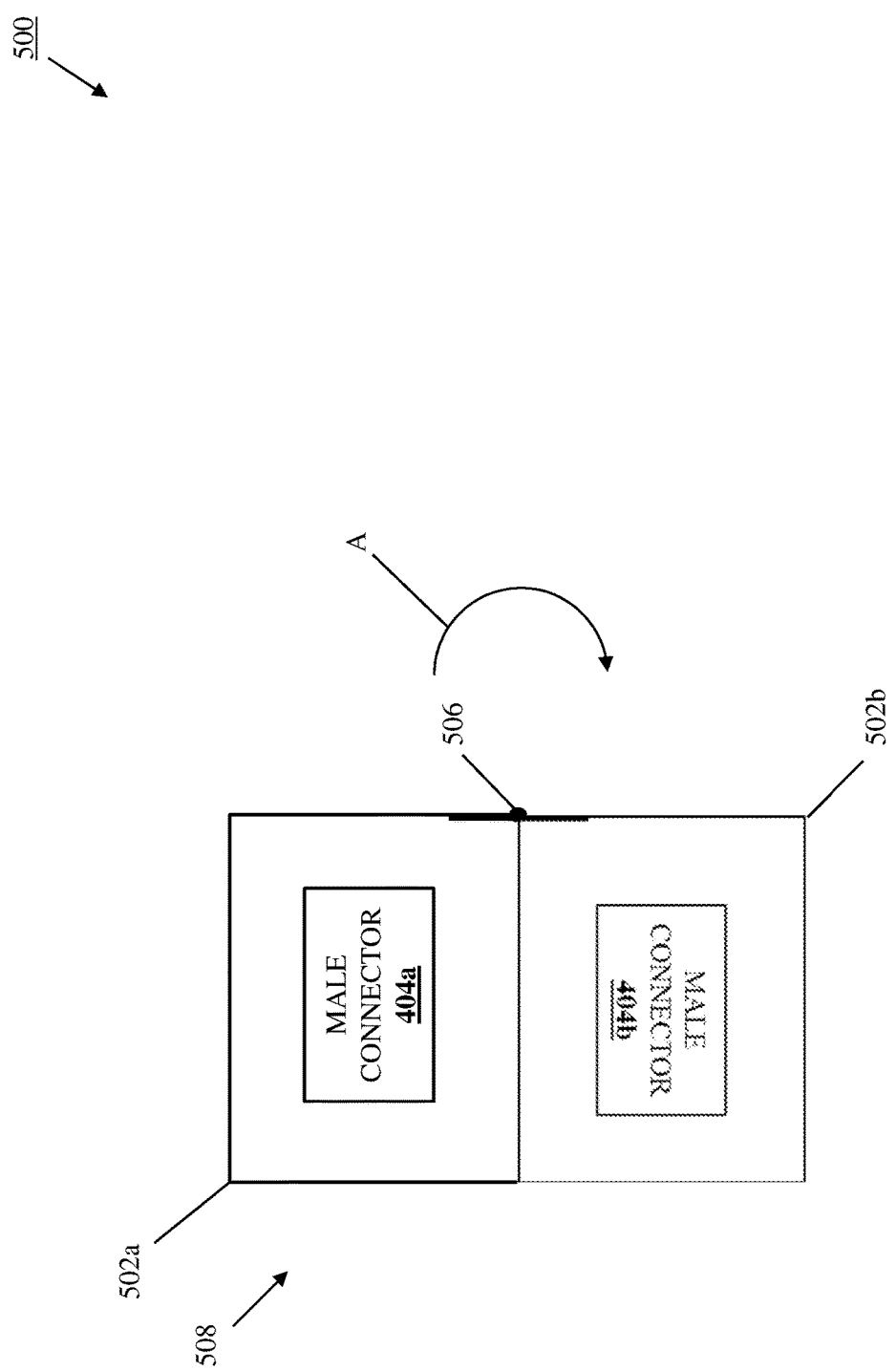
FIG. 5D is a schematic front view illustrating an embodiment of the PoE power aggregation device of FIG. 5A with the second powering device connector configuration.

For example, with reference to FIGS. 5C and 5D, the second chassis portion 502b may be rotated via the moveable coupling 506 in a direction A to reconfigure the male connectors 404a and 404b from the "side-by-side" orientation 504 illustrated and described above with reference to FIGS. 5A and 5B to a "stacked" orientation 508 with the male connector 404b inverted relative to the male connector 404a, which one of skill in the art in possession of the present disclosure will appreciate may be configured to allow the male connectors 404a and 404b to be connected to corresponding powering device ports on a powering device that are provided in different adjacent rows (e.g., a "top" row of powering device ports, and a "bottom" row of powering device ports on that powering device that are inverted relative to the "top" row of powering device ports).

While not illustrated or described in detail, one of skill in the art in possession of the present disclosure will appreciate how the PoE power aggregation device 500 may include orientation securing features that are configured to engage and secure the first chassis portion 502a and the second chassis portion 502b in either of the "side-by-side" orientation 504 and the "stacked" orientation 508. However, while a specific example of the PoE power aggregation device including configurable powering device connectors has been illustrated and described, one of skill in the art in possession of the present disclosure will appreciate how configurable powering device connectors may be provided on the PoE power aggregation device of the present disclosure in a variety of manners that will fall within the scope of the present disclosure as well.

Figure 6A:
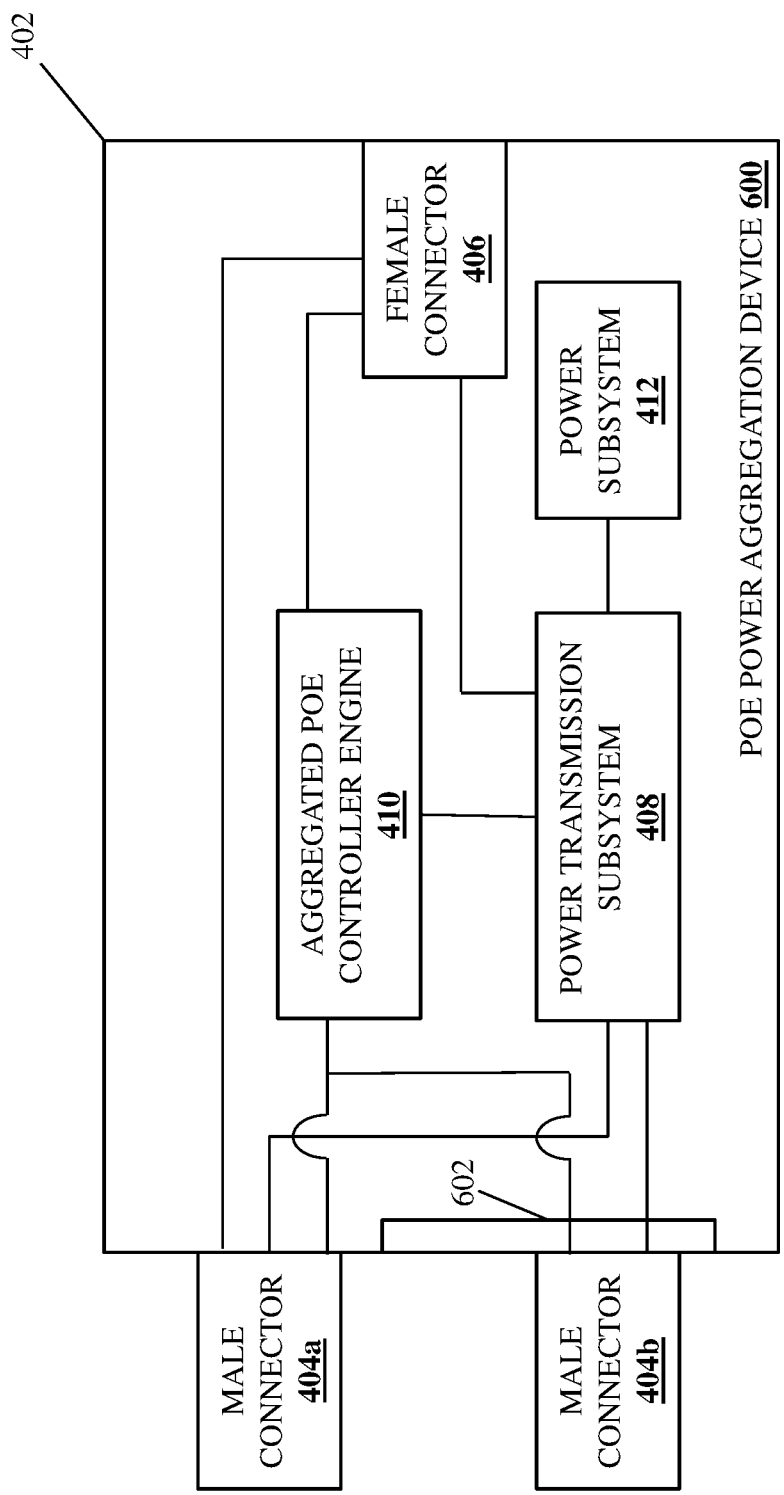
FIG. 6A is a schematic view illustrating an embodiment of the PoE power aggregation device of FIG. 4A with reconfigurable powering device connectors provided in a first powering device connector configuration.
Figure 6B:
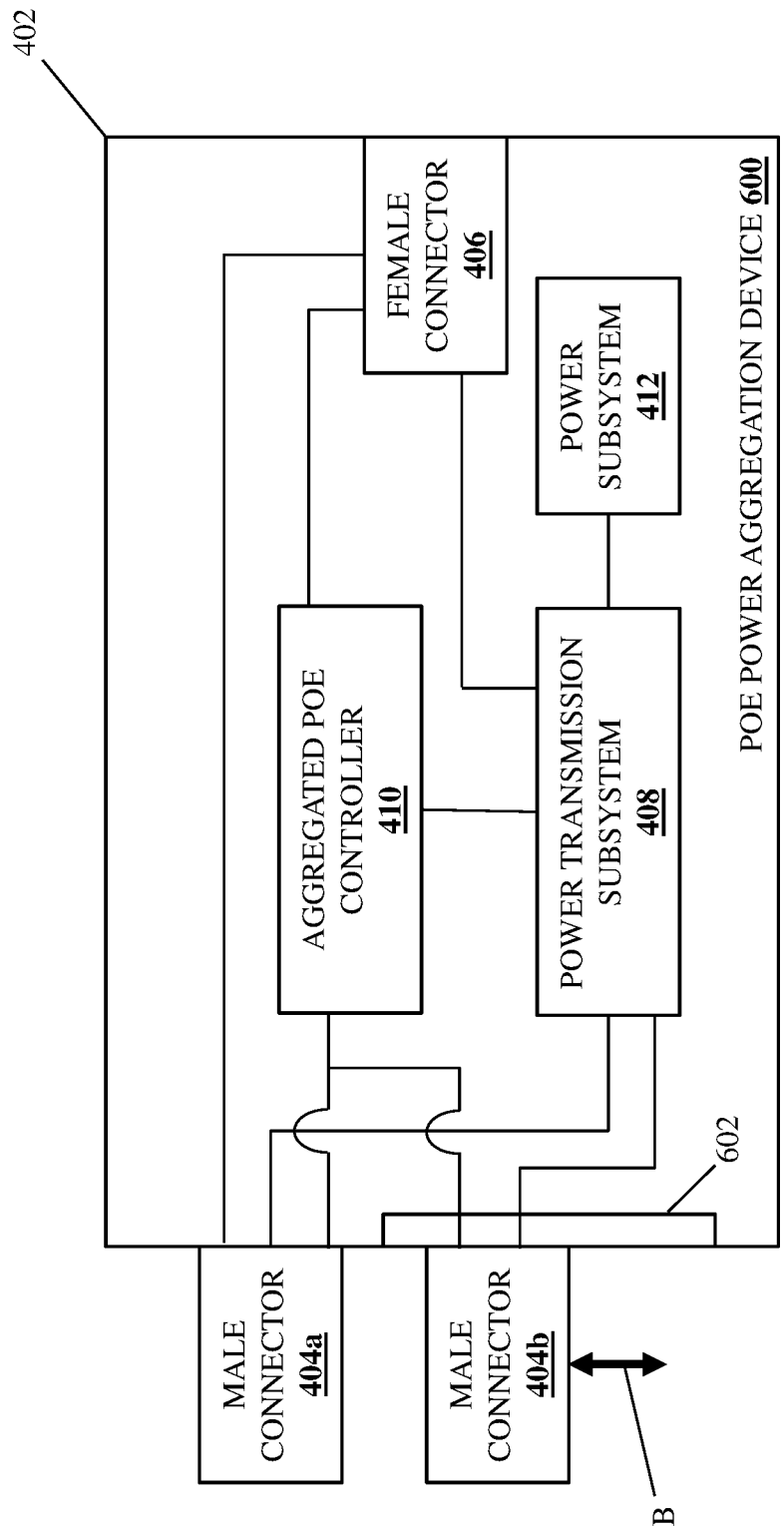
FIG. 6B is a schematic front view illustrating an embodiment of the PoE power aggregation device of FIG. 6A with reconfigurable powering device connectors provided in a second powering device connector configuration.

With reference to FIGS. 6A and 6B, an embodiment of a PoE power aggregation device 600 is illustrated that provides another specific example of the PoE power aggregation device 400 discussed above with reference to FIG. 4A with configurable powering device connectors, and similar components in the PoE power aggregation devices 400 and 600 have been provided with the same reference numbers. In the illustrated embodiment, the PoE power aggregation device 600 includes the male connector 404b connected to a moveable coupling 602 such as the slidable coupling illustrated and described below, or other movable coupling that one of skill in the art in possession of the present disclosure would recognize as providing the powering device connector reconfiguration functionality described below. As will be appreciated by one of skill in the art in possession of the present disclosure, any of a variety of flexible cabling, adjustable cable couplings, or other data conduits may be provided between the male connector 404b and the data and/or power couplings described above in order to allow the movement of the male connector 404b relative to the male connector 404a as described below.

For example, with reference to FIG. 6B, the male connector 404b may be moved via the moveable coupling 602 and along a direction B to adjust a distance between the male connectors 404a and 404b, which one of skill in the art in possession of the present disclosure will appreciate may be configured to allow the male connectors 404a and 404b to be connected to corresponding powering device ports on a powering device that may be spaced-apart by a variety of different distances that fall within a distance capable of being achieved between the male connectors 404a and 404b based on the range of motion of the male connector 404b via the movable coupling 602. While not illustrated or described in detail, one of skill in the art in possession of the present disclosure will appreciate how the PoE power aggregation device 600 may include connector securing features that are configured to secure the male connector 404b relative to the male connector 404a and prevent relative movement between the two (i.e., when a desired spacing is achieved).

Figure 6C:
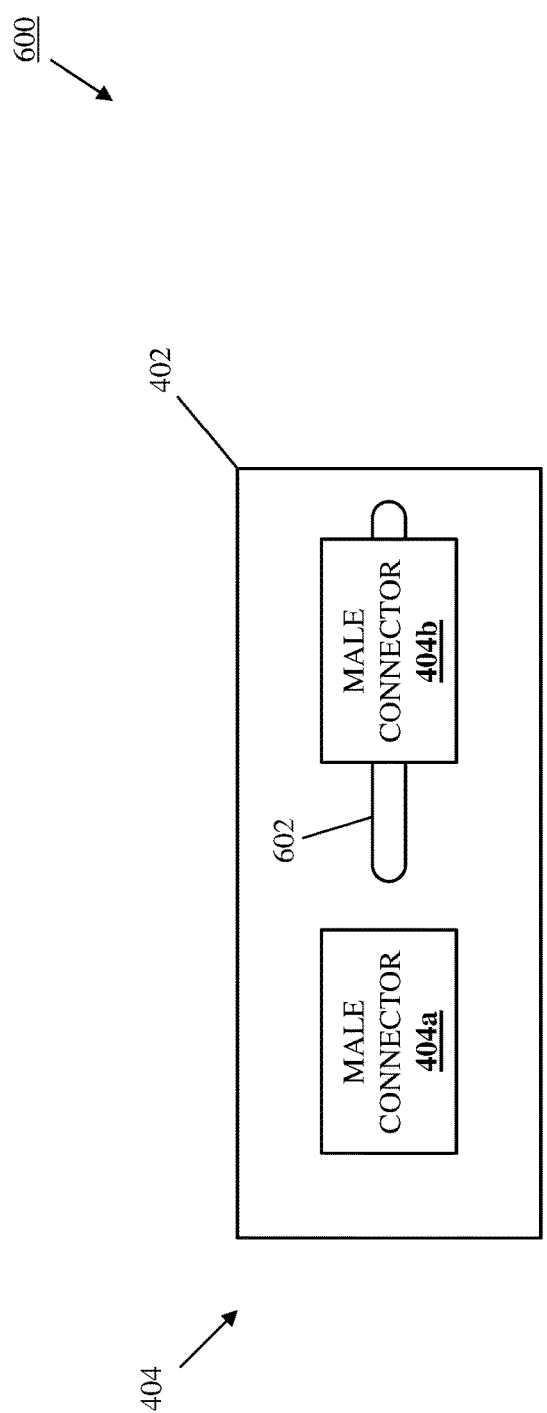
FIG. 6C is a schematic front view illustrating an embodiment of the first powering device connector configuration of the PoE power aggregation device of FIG. 6A.
Figure 6E:
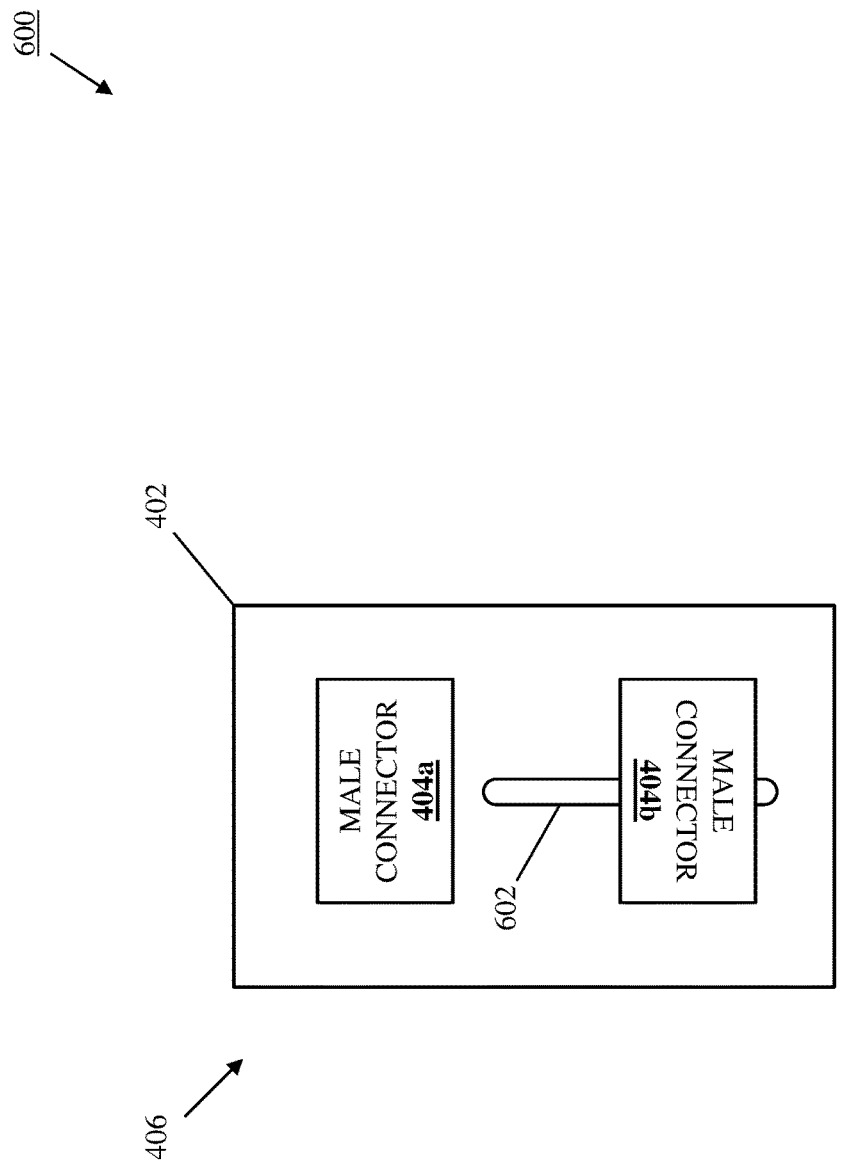
FIG. 6E is a schematic front view illustrating an embodiment of the first powering device connector configuration of the PoE power aggregation device of FIG. 6A.

With reference to FIGS. 6C and 6D, a specific example of the PoE power aggregation device 600 is illustrated that provides the male connectors 404a and 404b on the chassis 402 in the "side-by-side" orientation 404 discussed above, with the moveable coupling 602 allowing the distance between male connectors 404a and 404b in the "side-by-side" orientation 404 to be adjusted in order to allow those male connectors 404a and 404b to be connected to corresponding powering device ports on a powering device that are provided in the same row but that may be spaced apart by different distances. With reference to FIGS. 6E and 6F, a specific example of the PoE power aggregation device 600 is illustrated that provides the male connectors 404a and 404b on the chassis 402 in the "stacked" orientation 406 discussed above, with the moveable coupling 602 allowing the distance between male connectors 404a and 404b in the "stacked" orientation 404 to be adjusted in order to allow those male connectors 404a and 404b to be connected to corresponding powering device ports on a powering device that are provided in different adjacent rows but that may be spaced apart by different distances.

Figure 7A:
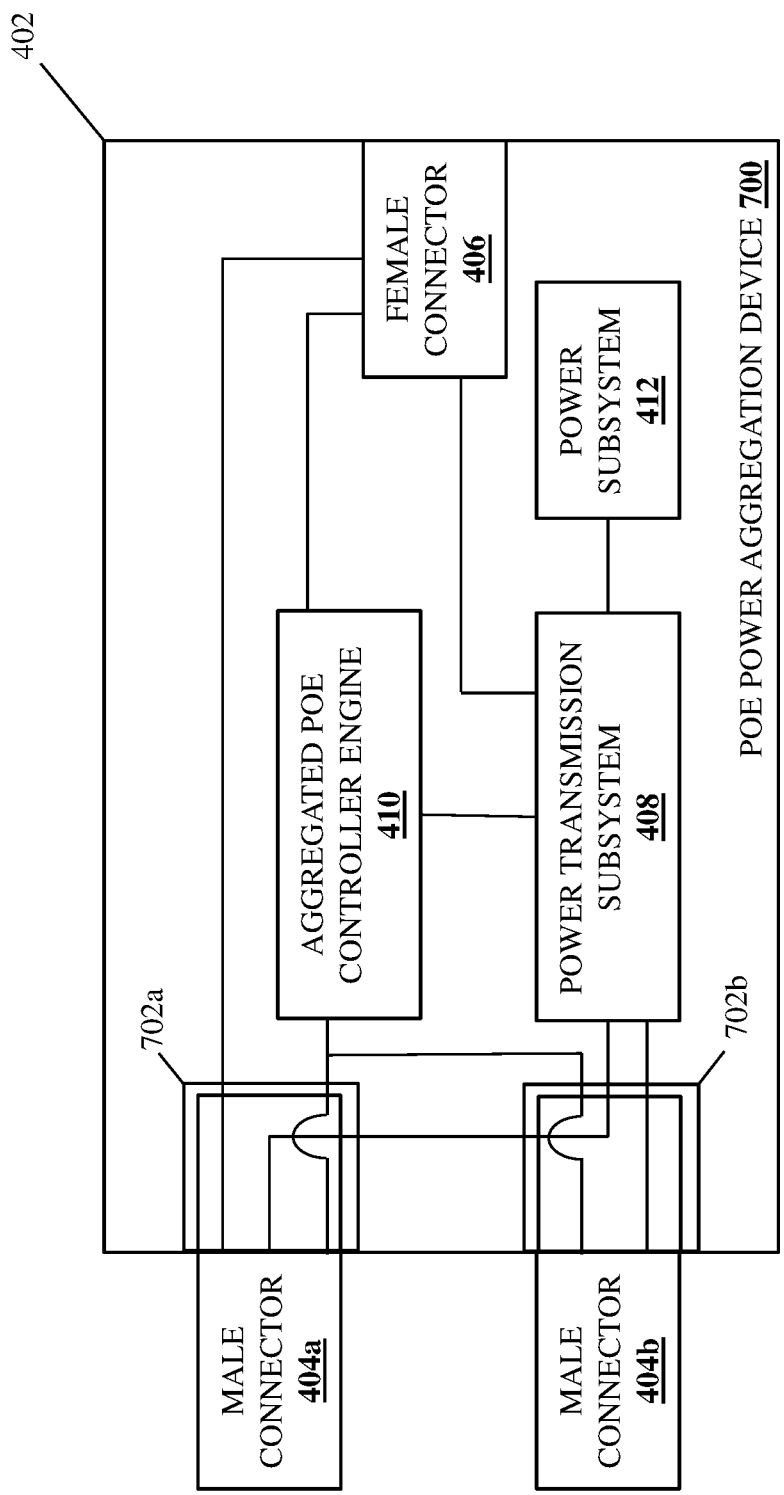
FIG. 7A is a schematic view illustrating an embodiment of the PoE power aggregation device of FIG. 4A with reconfigurable powering device connectors provided in a first powering device connector configuration.

With reference to FIGS. 7A and 7B, an embodiment of a PoE power aggregation device 700 is illustrated that provides another specific example of the PoE power aggregation device 400 discussed above with reference to FIG. 4A with configurable powering device connectors, and similar components in the PoE power aggregation devices 400 and 700 have been provided with the same reference numbers. In the illustrated embodiment, the PoE power aggregation device 700 includes the male connectors 404a and 404b connected to movable couplings 702a and 702b, respectively, such as the slidable couplings illustrated and described below, or other movable coupling that one of skill in the art in possession of the present disclosure would recognize as providing the powering device connector reconfiguration functionality described below. As will be appreciated by one of skill in the art in possession of the present disclosure, any of a variety of flexible cabling, adjustable cable couplings, or other data conduits may be provided between the male connectors 404a and 404b and the data and/or power couplings described above in order to allow the movement of the male connectors 404a and 404b relative to the chassis 402 as described below.

For example, with reference to FIG. 7B, either or both of the male connectors 404a and 404b may be moved via their respective moveable couplings 702a and 702b and along a direction C to adjust a distance between either of the male connectors 404a and 404b and the chassis 402, which one of skill in the art in possession of the present disclosure will appreciate may be configured to allow the male connectors 404a and 404b to be connected to corresponding powering device ports on a powering device that may be provided at different depths on that powering device that fall within a distance capable of being achieved between the male connectors 404a and 404b based on the range of motion of the male connectors 404a and 404b via their respective moveable couplings 702a and 702b. While not illustrated or described in detail, one of skill in the art in possession of the present disclosure will appreciate how the PoE power aggregation device 700 may include connector securing features that are configured to secure the male connectors 404a and 404b relative to the chassis 402 and prevent relative movement between the two (i.e., when a desired spacing is achieved). As will be appreciated by one of skill in the art in possession of the present disclosure, the configurable powering device connectors on the PoE power aggregation device 700 may be provided in either of the "side-by-side" or "stacked" orientations described above while remaining within the scope of the present disclosure.

Figure 8:
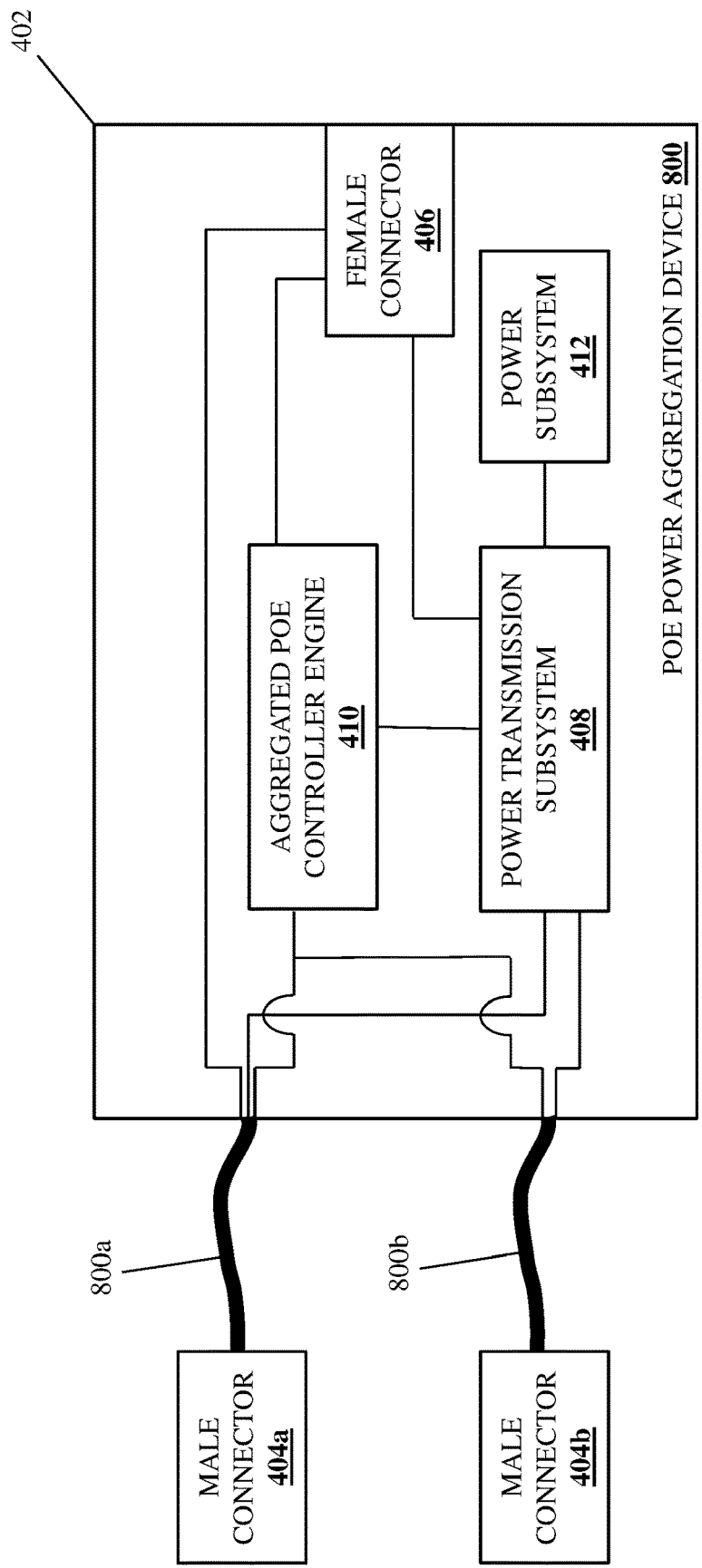
FIG. 8 is a schematic view illustrating an embodiment of the PoE power aggregation device of FIG. 4A with cabled powering device connectors.

With reference to FIG. 8, an embodiment of a PoE power aggregation device 500 is illustrated that provides another specific example of the PoE power aggregation device 400 discussed above with reference to FIG. 4A with configurable powering device connectors, and similar components in the PoE power aggregation devices 400 and 700 have been provided with the same reference numbers. In the illustrated embodiment, the PoE power aggregation device 700 includes the male connectors 404a and 404b connected to cables 800a and 800b, respectively, that may be provided by Ethernet cables in some embodiments, but that one of skill in the art in possession of the present disclosure will appreciate may be provided by other cables that are configured to transmit the data and power as described below. As will be appreciated by one of skill in the art in possession of the present disclosure, the male connectors 404a and 404b may be moved via their respective cables 800a and 800b to allow the male connectors 404a and 404b to be connected to corresponding powering device ports on a powering device that are spaced apart within a distance capable of being achieved between the male connectors 404a and 404b based on the length of their respective cables 800a and 800b. As will be appreciated by one of skill in the art in possession of the present disclosure, the cables 800a and 800b on the PoE power aggregation device 700 may allow the male connectors 404a and 404b to be connected to powering device ports that are provided in either of the "side-by-side" or "stacked" orientations described above while remaining within the scope of the present disclosure.

However, while several specific examples of PoE power aggregation devices with configurable powering device connector functionality have been illustrated and described, one of skill in the art in possession of the present disclosure will appreciate how combinations of the configurable powering device connector functionality described above for the PoE power aggregation devices 500, 600, 700, and 800 may be provided to further enhance the configurability of the powering device connectors on the PoE power aggregation device of the present disclosure.

Figure 9:
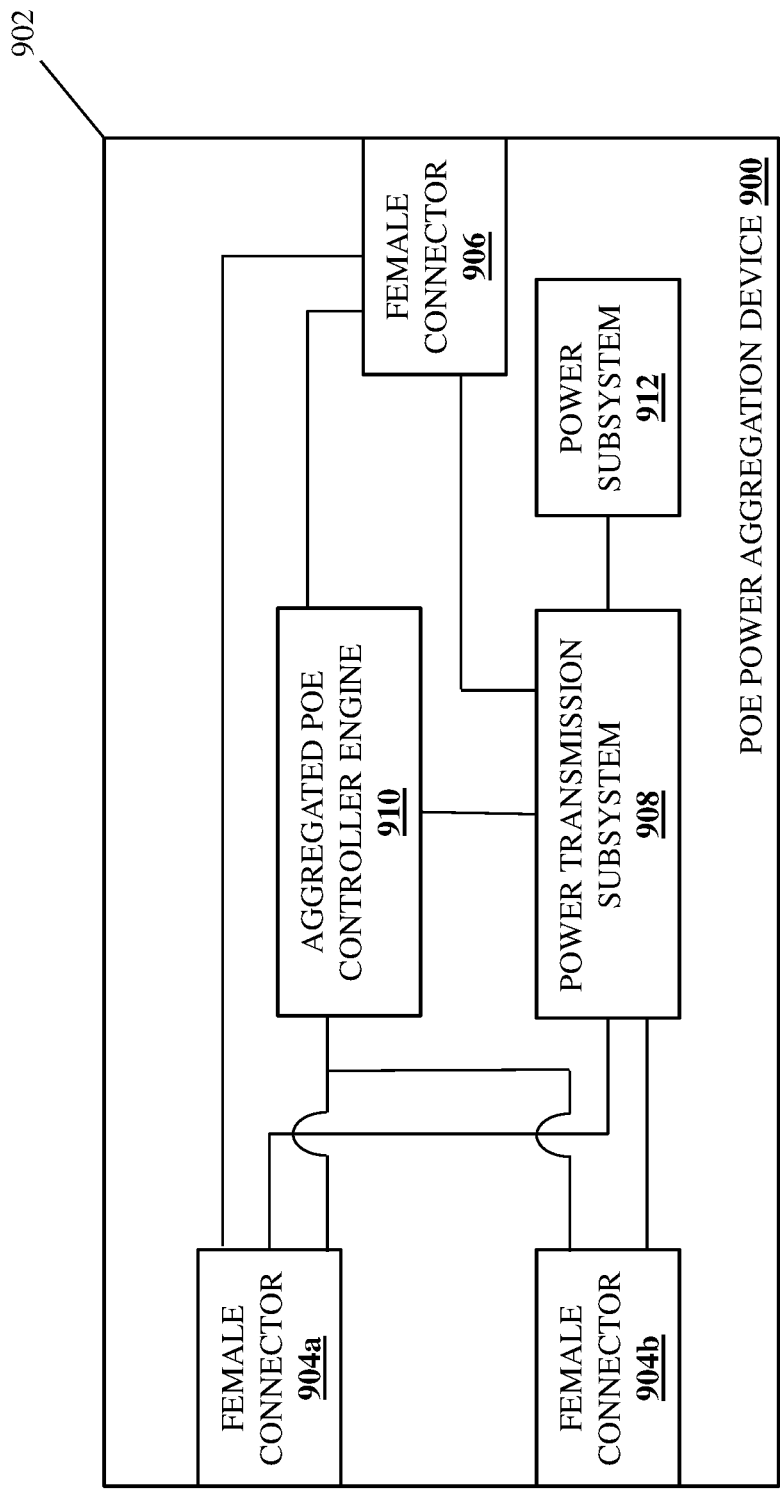
FIG. 9 is a schematic view illustrating an embodiment of the PoE power aggregation device of FIG. 4A.

With reference to FIG. 9, a specific embodiment of a PoE power aggregation device 900 is illustrated that may provide the PoE power aggregation device 300 discussed above with reference to FIG. 3. In the illustrated embodiment, the PoE power aggregation device 900 includes a chassis 902 that houses the components of the PoE power aggregation device 900, only some of which are illustrated and described below. The chassis 902 includes a pair of female connectors 904a and 904b that provide a specific example of the plurality of powering device connectors 304a-304c discussed above with reference to FIG. 3 and that, as discussed below, may configure the PoE power aggregation device 900 to allow a conventional PoE powering device to power some PoE+ powered devices, or configure the PoE power aggregation device 400 to allow a PoE+ powering device to power some UPoE powered devices. In many of the embodiments discussed below, the powering device connectors 904a and 904b are provided by Ethernet connectors, although one of skill in the art in possession of the present disclosure will appreciate how other types of female connectors may enable the teachings of the present disclosure and thus are envisioned as falling within its scope as well.

Furthermore, the chassis 902 also includes a female connector 406 that provides a specific example of the powered device connector discussed above with reference to FIG. 3, with the female connector 906 coupled to the female connector 904a by cabling, traces in a circuit board that supports the female connector 906 and the female connector 904a, and/or other data communication subsystems that may operate as a data "passthrough" to allow data received at the female connector 904a to be transmitted via the female connector 906. However, similarly as discussed above, while described as providing a data "passthrough", one of skill in the art in possession of the present disclosure will appreciate how the data communication subsystem that couples the female connector 906 to the female connector 904a may include processing elements for processing the data received at the female connector 904a and transmitted via the female connector 906 while remaining within the scope of the present disclosure as well. Furthermore, while the embodiments illustrated and discussed below only describe the data communication subsystem as coupling the female connector 906 to the female connector 904a, other embodiments may provide the data communication subsystem coupling the female connector 906 to any or all of the female connectors 904a and 904b while remaining within the scope of the present disclosure as well. In many of the embodiments discussed below, the female connector 906 is provided by an Ethernet connector, although one of skill in the art in possession of the present disclosure will appreciate how other types of female connectors may enable the teachings of the present disclosure and thus are envisioned as falling within its scope as well.

In the illustrated embodiment, the chassis 902 also houses a power transmission subsystem 908 that is coupled to each of the female connectors 904a and 904b, as well as to the female connector 906. Similarly as discussed above, the power transmission subsystem 408 may be provided by an integrated circuit device, a power combiner device, a DC-to-DC converter device, and/or other devices that one of skill in the art in possession of the present disclosure will recognize may be configured to aggregate power received from any combination of the powering device connectors 304a-304c as described below. As also described above, in some embodiments a parallel power circuit may be provided using transformers (e.g., to combine power from multiple powering device ports), diodes (e.g., to prevent current from flowing back to an power input), capacitors (e.g., to filter out noise), resistors (e.g., to load balance power and serve power to the powered device), and/or other power handling components known in the art. However, while described as being provided by particular devices, one of skill in the art in possession of the present disclosure will appreciate how the power transmission subsystem 908 may be provided using a variety of power transmission components that are configured to perform the power transmission functionality described below while remaining within the scope of the present disclosure as well.

In some embodiments, the chassis 902 may house a processing system (not illustrated, but which may be similar to the processor 102 discussed above with reference to FIG. 1) and a memory system (not illustrated, but which may be similar to the memory 114 discussed above with reference to FIG. 1) that is coupled to the processing system and that includes instructions that, when executed by the processing system, cause the processing system to provide an aggregated PoE controller engine 910 that is configured to perform the functionality of the aggregated PoE controller engines, aggregated PoE controller subsystems, and/or PoE power aggregation devices discussed below. However, while the aggregated PoE controller engine 910 is illustrated and described below as being included in the PoE power aggregation device 900 and configured to perform powering device configuration operations, power negotiation operations, and/or other PoE controller operations that would be apparent to one of skill in the art in possession of the present disclosure, other embodiments of the present disclosure may omit the aggregated PoE controller engine 910 from the PoE power aggregation device 900, with the powering device configuration operations performed by a user, and the power negotiation operations and other PoE controller operations performed by the powering device and powered device via the PoE power aggregation device 900 (e.g., using the data "passthrough" provided by the PoE power aggregation device 900) as described in further detail below.

As illustrated, in embodiments that include the aggregated PoE controller engine 910, the aggregated PoE controller engine 910 may be coupled to each of the female connectors 904a and 904b (e.g., via a coupling between each of the female connectors 904a and 904b and the processing system discussed above), the power transmission subsystem 908 (e.g., via a coupling between the powering transmission subsystem 908 and the processing system discussed above), and the female connector 906 (e.g., via a coupling between the female connector 906 and the processing system discussed above). Furthermore, the chassis 902 may also house a power subsystem 912 that is coupled to the power transmission subsystem 908, and that may be coupled to any of the PoE power aggregation components in the PoE power aggregation device 900 and configured to receive power from the power transmission subsystem 908 and provide that power to those PoE power aggregation components in order to enable the PoE power aggregation functionality described above. While not described in detail below, one of skill in the art in possession of the present disclosure will appreciate how the PoE power aggregation device 900 may operate similarly to the PoE powering device 400 discussed above but with the male connectors 404a and 404b on the PoE powering device 400 replaced by the female connectors 904a and 904b on the PoE powering device 900 that are configured to be coupled to powering device ports on a powering device via cabling (e.g., Ethernet cables).

Figure 10:
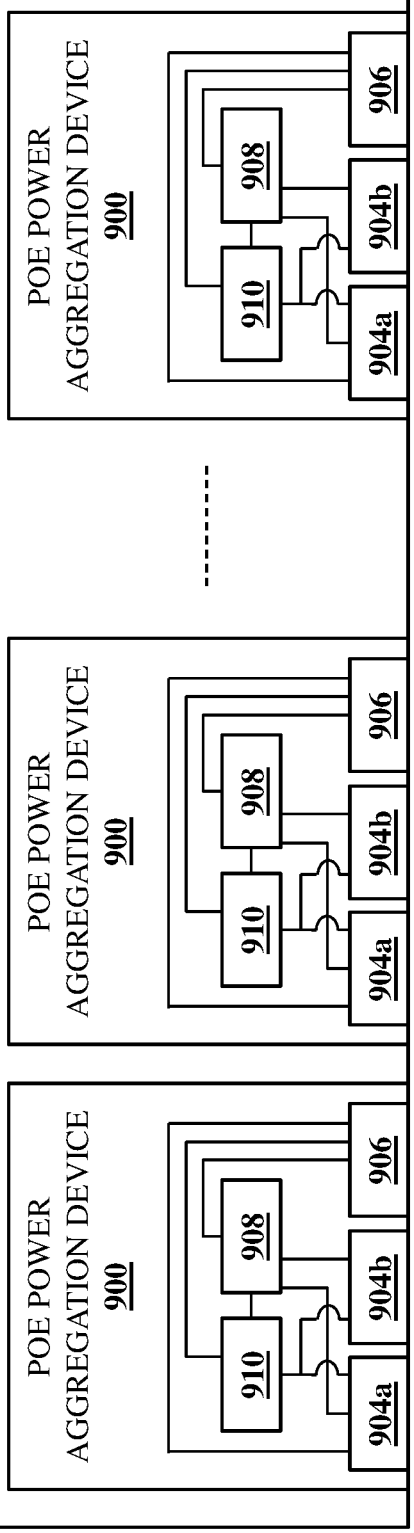
FIG. 10 is a schematic view illustrating an embodiment of a rackable PoE power aggregation system including a plurality of the PoE power aggregation devices of FIG. 9.

With reference to FIG. 10, an embodiment of a rackable PoE power aggregation system 1000 is illustrated. In the illustrated embodiment, the rackable PoE power aggregation system 1000 includes a chassis 1002 that, in specific examples, may be dimensioned such that it is configured to be housed in a 1 Rack Unit (RU) computing device housing in a rack that is configured to house computing devices (although different sized chassis for the rackable PoE power aggregation system 1000 (e.g., 2 RU or more, chassis that occupy half of a 1 RU computing device housing, etc.) are envisioned as falling within the scope of the present disclosure as well). In the illustrated embodiment, a plurality of the PoE power aggregation devices 900 are included in the chassis 1002 of the rackable PoE power aggregation system 1000. As will be appreciated by one of skill in the art in possession of the present disclosure, the plurality of PoE power aggregation devices 900 need not each include their respective chassis 902 when provided in the chassis 1002 of the rackable PoE power aggregation system 1000, may share a common aggregated PoE controller engine when provided in the chassis 1002 of the rackable PoE power aggregation system 1000 (e.g., rather than each including a respective aggregated PoE controller engine 910 as illustrated), and/or may be subject to other modifications relative to the "standalone" PoE power aggregation device 900 discussed above with reference to FIG. 9. As such, the respective pair of female connectors 904a and 904b (i.e., powering device connectors), along with the respective female connector 906 (i.e., a powered device connector) on each of the PoE power aggregation devices 900 may be accessible on a surface of the rackable PoE power aggregation system 1000, and the rackable PoE power aggregation system 1000 may be positioned in a rack (e.g., a 1 RU housing defined by the rack).

Figure 11:
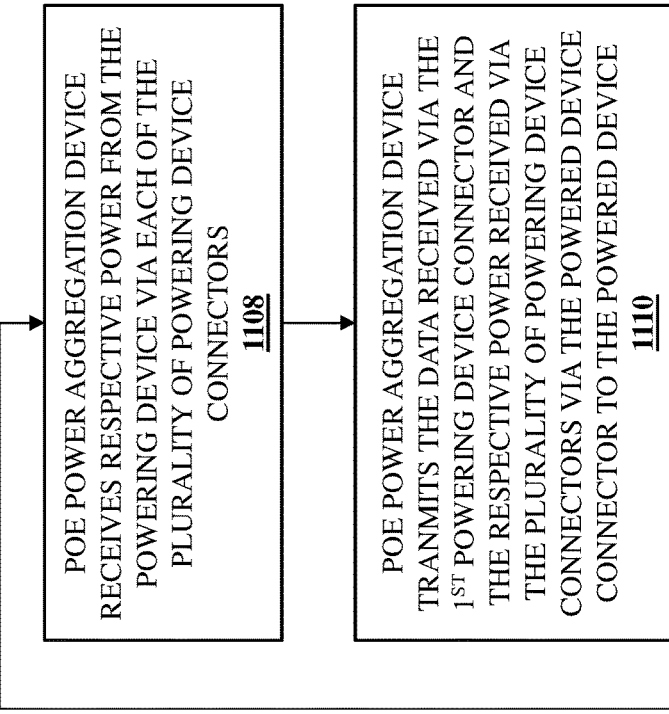
FIG. 11 is a flow chart illustrating an embodiment of a method for aggregating PoE power from a powering device for use by a powered device.
Figure 11:
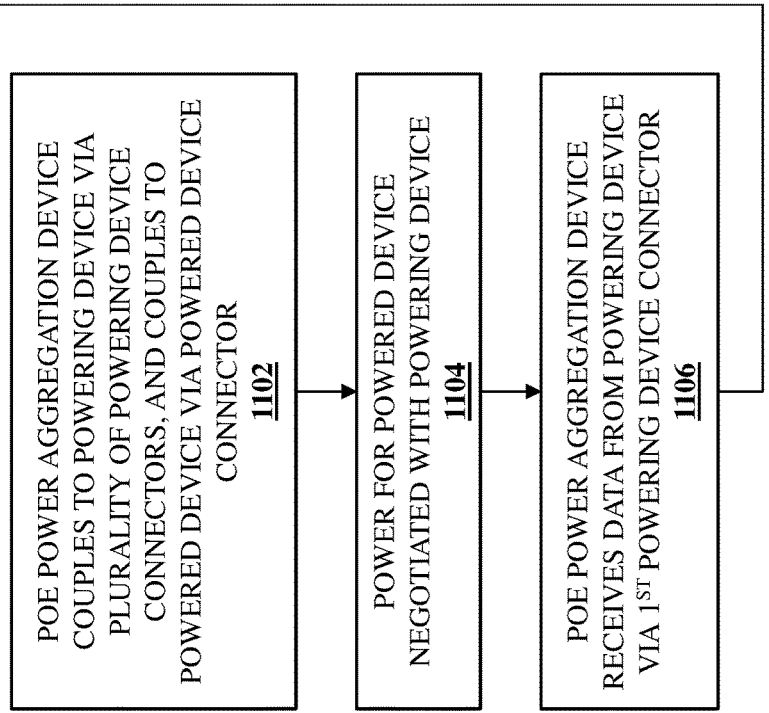

Referring now to FIG. 11, an embodiment of a method 1100 for aggregating PoE power from a powering device for use by a powered device is illustrated. As discussed below, the systems and methods of the present disclosure provide for the aggregation of respective power received from multiple powering device ports on a powering device, and the transmission of that respective power along with data received from at least one of those powering device ports to a powered device. For example, the PoE power aggregation system of the present disclosure may include a PoE power aggregation device coupling a powering device to a powered device. The PoE power aggregation device includes first and second powering device connectors coupled to first and second powering device ports on the powering device, respectively, and a powered device connector coupled to a powered device port on the powered device. The PoE power aggregation device receives data from the powering device via the connected first powering device port/first powering device connector, and transmits the data to the powered device through the connected powered device connector/powered device port. The PoE power aggregation device also receives first and second power from the powering device via the connected first powering device port/first powering device connector and the connected second powering device port/second powering device connector, respectively, and transmits the first and second power to the powered device through the connected powered device connector/powered device port along with the data. As such, powering devices may power powered devices that require a power level that exceeds the maximum power available from any one of their powering device ports by aggregating power from a plurality of those powering device ports and providing that aggregated power to that powered device.

Figure 12:
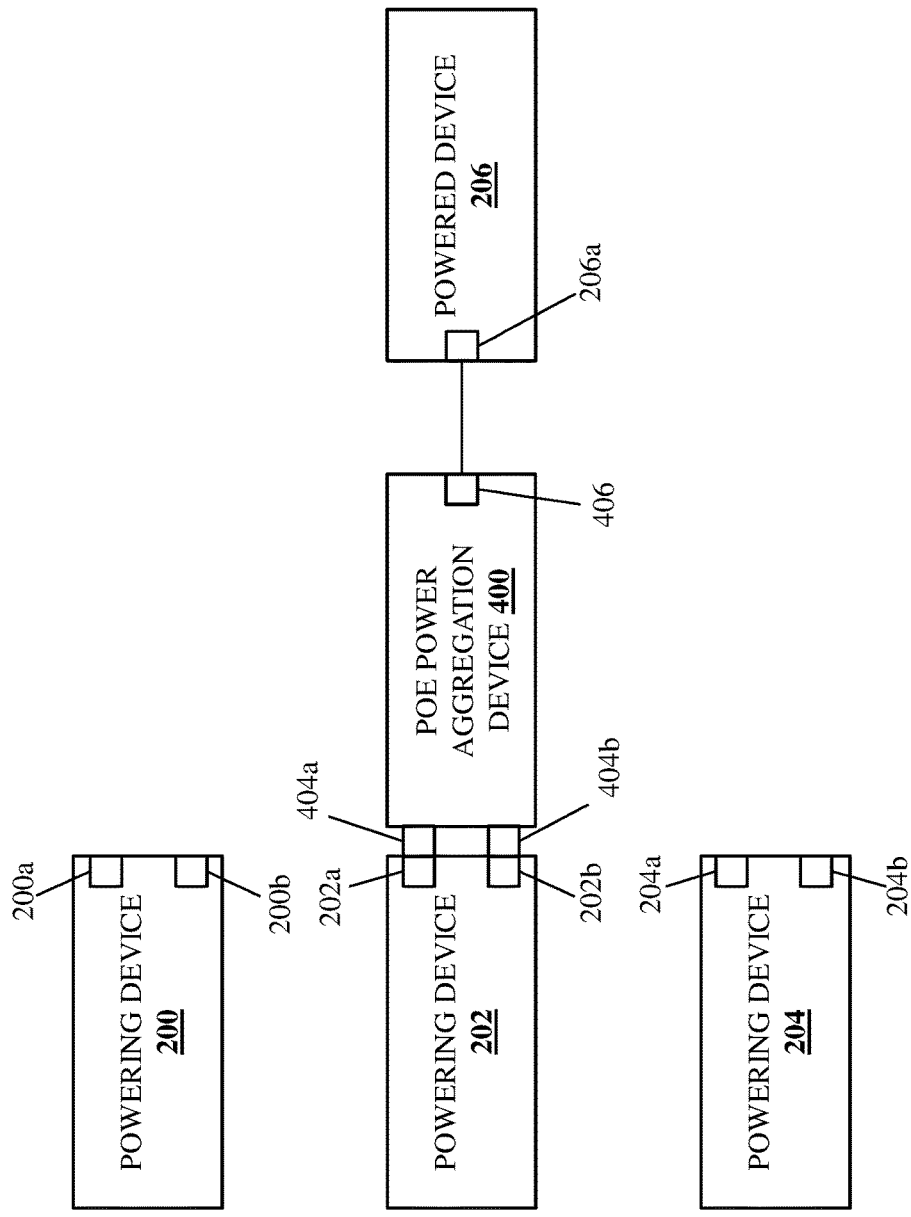
FIG. 12 is a schematic view illustrating an embodiment of the PoE power aggregation device of FIG. 4A coupled a powering device and the powered device in the networked system of FIG. 2 to provide the PoE power aggregation system of the present disclosure.

The method 1100 begins at block 1102 where a PoE power aggregation device couples to a powering device via a plurality of powering device connectors, and couples to a powered device via a powered device connector. With reference to FIG. 12, in an embodiment of block 1102, the PoE power aggregation device 400 may be coupled to the powering device 200b by connecting the male connectors 404a and 404b that provide the powering device connectors on the PoE power aggregation device 400 to the powering device ports 202a and 202b (e.g., female powering device ports), respectively, on the powering device 200b. As will be appreciated by one of skill in the art in possession of the present disclosure, the male connectors 404a and 404b on the PoE power aggregation device 400 may be moved relative to each other as described above with reference to the PoE power aggregation devices 500, 600, 700, and/or 800 in order to provide for the connection of those male connectors 404a and 404b to the powering device ports 202a and 202b as illustrated in FIG. 12.

Furthermore, while not illustrated and described in detail, one of skill in the art in possession of the present disclosure will recognize how, at block 1102, the female connectors 904a and 904b that provide the powering device connectors on the PoE power aggregation device 900 discussed above with reference to FIG. 9 may be coupled to the powering device ports 202a and 202b (e.g., female powering device ports), respectively, on the powering device 200b via respective cables (e.g., Ethernet cables). Further still, while the PoE power aggregation devices are described above as being connected to the powering device 202b, one of skill in the art in possession of the present disclosure will appreciate how PoE power aggregation devices may be connected to the powering devices 202a and/or 202c while remaining within the scope of the present disclosure as well.

With continued reference to FIG. 12, in an embodiment of block 1102, the PoE power aggregation device 400 may also be coupled to the powered device 206 by coupling the female connector 406 that provides the powered device connector on the PoE power aggregation device 400 to the powered device port 206a (e.g., a female powered device port) on the powered device 206 via a cable (e.g., an Ethernet cable). Furthermore, while not illustrated and described in detail, one of skill in the art in possession of the present disclosure will recognize how, at block 1102, the female connector 906 that provides the powered device connector on the PoE power aggregation device 900 discussed above with reference to FIG. 9 may be coupled to the powered device port 206a (e.g., a female powered device port) on the powered device 206 via a cable (e.g., an Ethernet cable). Further still, while not illustrated and described in detail, one of skill in the art in possession of the present disclosure will appreciate how any of the PoE power aggregation devices 900 in the rackable PoE power aggregation system 1000 may couple a powering device to a powered device in a manner similar to that described for the stand-alone PoE power aggregation device 900.

As will be appreciated by one of skill in the art in possession of the present disclosure, the use of the PoE power aggregation device 400 to couple the powering device ports 202a and 202b on the powering device 202 to the powered device port 206a on the powered device 206 provides an embodiment of a PoE power aggregation system 1200 according to the teachings of the present disclosure. Furthermore, while the specific example provided herein only illustrates and describes two powering device connectors on the PoE power aggregation device connected to corresponding powering device ports on the powering device 202, as discussed above three (or more) powering device connectors on the PoE power aggregation device may be connected to corresponding powering device ports on a powering device in order to aggregate increasing amounts of power for provisioning to powered device with relatively high power requirements.

The method 1100 then proceeds to block 1104 where power for the powered device is negotiated with the powering device. As discussed above, some embodiments of present disclosure may provide the aggregated PoE controller engine 410 in the PoE power aggregation device 400 that is configured to perform powering device configuration operations, power negotiation operations, and/or other PoE controller operations that would be apparent to one of skill in the art in possession of the present disclosure. However, other embodiments of the present disclosure may omit the aggregated PoE controller engine 410 from the PoE power aggregation device 400, with the powering device configuration operations performed by a user, and the power negotiation operations and other PoE controller operations performed by the powering device and the powered device via the PoE power aggregation device 400 (e.g., using the data "passthrough" provided by the PoE power aggregation device 400)

Figure 13A:
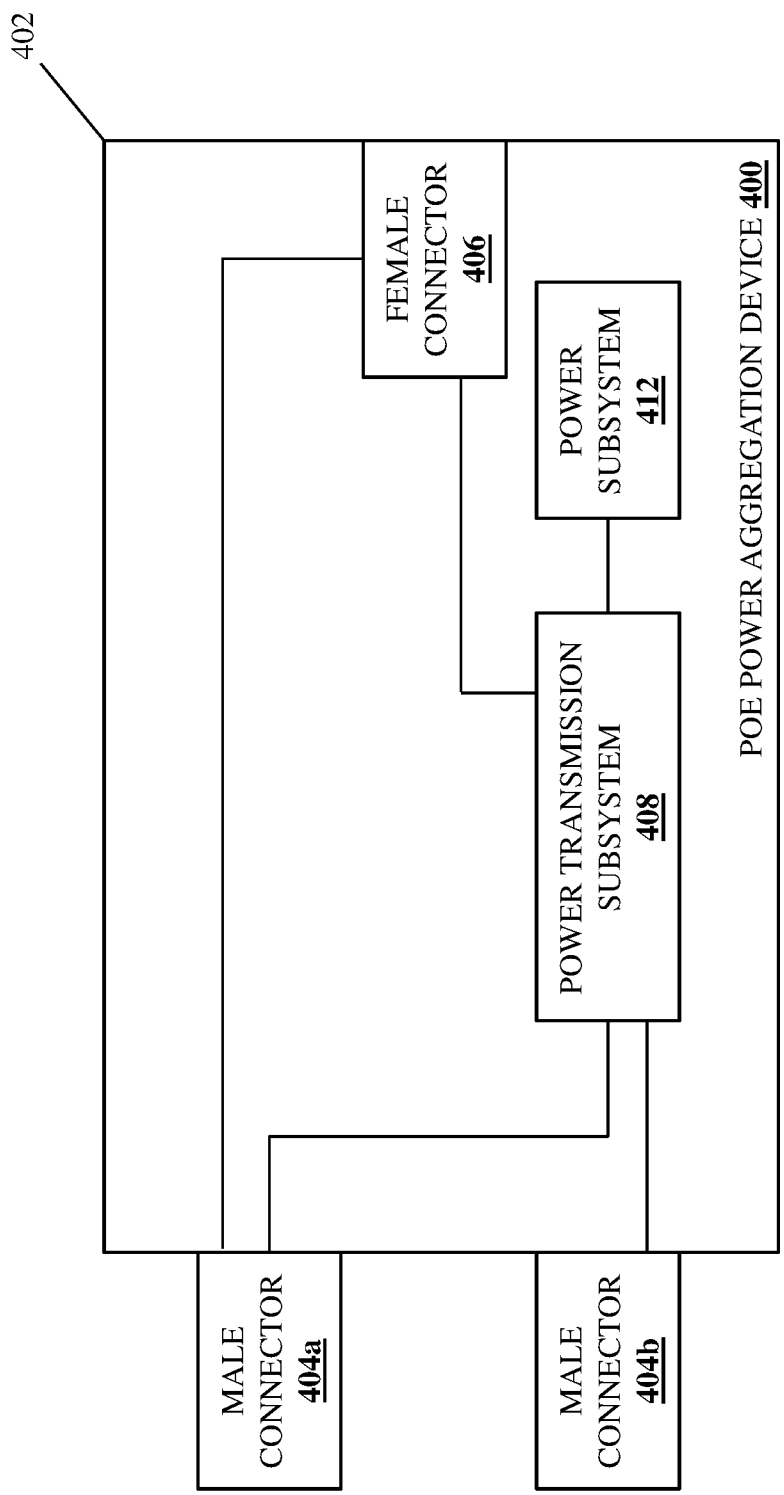
FIG. 13A is a schematic view illustrating an embodiment of the PoE power aggregation device of FIG. 4A that may be used during the method of FIG. 11.

With reference to FIG. 13, an embodiment of the PoE power aggregation device 400 is illustrated that does not include the aggregated PoE controller engine 410 discussed above with reference to FIG. 4A. In such embodiments, following the coupling of the powering device 202 to the powered device 206 as discussed above with reference to FIG. 12, a network administrator or other user may access the powered device 202 (e.g., via a Command Line Interface (CLI) or a variety of other management access techniques that would be apparent to one of skill in the art in possession of the present disclosure), configure a "logical PoE port" (referred to as "PoE-1" in the example below) on the powering device 202, and add the powering device ports 202a and 202b (referred to as "Eth 1/1/1" and "Eth 1/1/2" in the example below) using, for example, the commands provided below via an Operating System (OS):

OS(conf) #interface poe-channel PoE-1
OS(conf-if-PoE-1) #interface range Eth 1/1/1/-1/1/2
OS(conf-if-PoE-1) #exit As discussed below and as will be appreciated by one of skill in the art in possession of the present disclosure, the commands above may configure the powering device port/ "Eth 1/1/1" to transmit both data and power, while configuring the powering device port/"Eth 1/1/2" to transmit power. In some embodiments, at block 1104 the network administrator or other user may then configure the powering device ports 202a and 202b on the powering device 202 to transmit respective amounts of power, the sum of which satisfy the power requirements of the powered device 206 (as determined by the network administrator or other user based on their knowledge of the powered device 206).

Figure 13B:
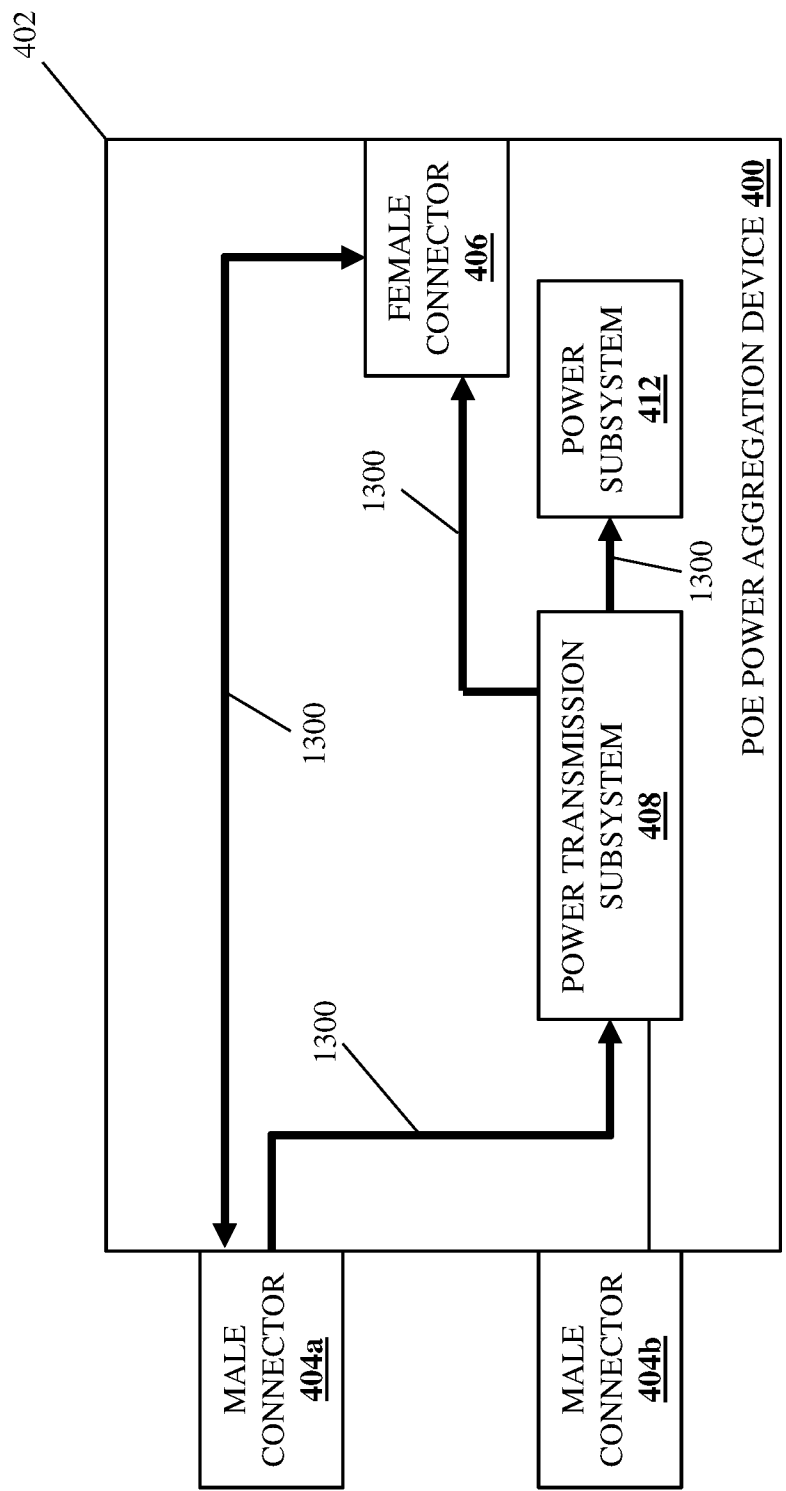
FIG. 13B is a schematic view illustrating the PoE power aggregation device of FIG. 13A operating during the method of FIG. 11.

However, with reference to FIG. 13B, in other embodiments and following the configuration of the powering device ports 202a and 202b on the powering device 202 by the network administrator or other user as described above, the powering device 202 and the powered device 206 may perform power negotiation operations 1300 via the PoE power aggregation device 400 in order to negotiate the power that will be provided by the powering device 202 to the powered device 206. For example, the power negotiation operations 1300 may begin with the powering device 202 providing power having an initial voltage via its powering device port 202a, the male connector 404a, the power transmission subsystem 408, the female connector 406, and to the powered device 206 via its powered device port 206a in order to power the powered device 206. Furthermore, as illustrated in FIG. 13B, a subset of the power received from the powering device 202 at the power transmission subsystem 408 may be provided to the power subsystem 412 in order to power the PoE power aggregation device 400 as well.

The power negotiation operations 1300 may then include the powering device 202 providing power having an increased voltage (i.e., relative to the initial voltage discussed above) via its powering device port 202a, the male connector 404a, the power transmission subsystem 408, the female connector 406, and to the powered device 206 via its powered device port 206a, and one of skill in the art in possession of the present disclosure will appreciate how the provisioning of the power with the increased voltage may allow the powering device 202 to determine a class of the powered device 206 via the powered device 206 drawing power according its class (e.g., a class 4 powered device). The power negotiation operations 1300 may then include the powering device 202 providing a type field request via its powering device port 202a, the male connector 404a, through the data "passthrough" discussed above to the female connector 406, and to the powered device 206 via its powered device port 206a, and one of skill in the art in possession of the present disclosure will appreciate how the provisioning of the type field request may cause the powered device 206 to respond to the powering device 202 with its type (e.g., type 2) via its powered device port 206a, the female connector 406, through the data "passthrough" discussed above to the male connector 404a, and via the powering device port 202a on the powering device 202.

The power negotiation operations 1300 may then include the powering device 202 advertising its available power (e.g., 30 watts based on a maximum 15 watts available from each of the powering devices ports 202a and 202b in a specific example) via its powering device port 202a, the male connector 404a, through the data "passthrough" discussed above to the female connector 406, and to the powered device 206 via its powered device port 206a, and one of skill in the art in possession of the present disclosure will appreciate how the advertisement of the available power may allow the powered device 206 to respond with a requested power (e.g., 25 watts) via its powered device port 206a, the female connector 406, through the data "passthrough" discussed above to the male connector 404a, and via the powering device port 202a on the powering device 202, allowing the powering device 202 to subsequently transmit that requested power via the powering device ports 202a and 202b. However, while specific power negotiation operations have been described, one of skill in the art in possession of the present disclosure will appreciate how the power that will be provided by the powering device to the powered device may be negotiated in a variety of manners that will fall within the scope of the present disclosure as well.

Figure 14A:
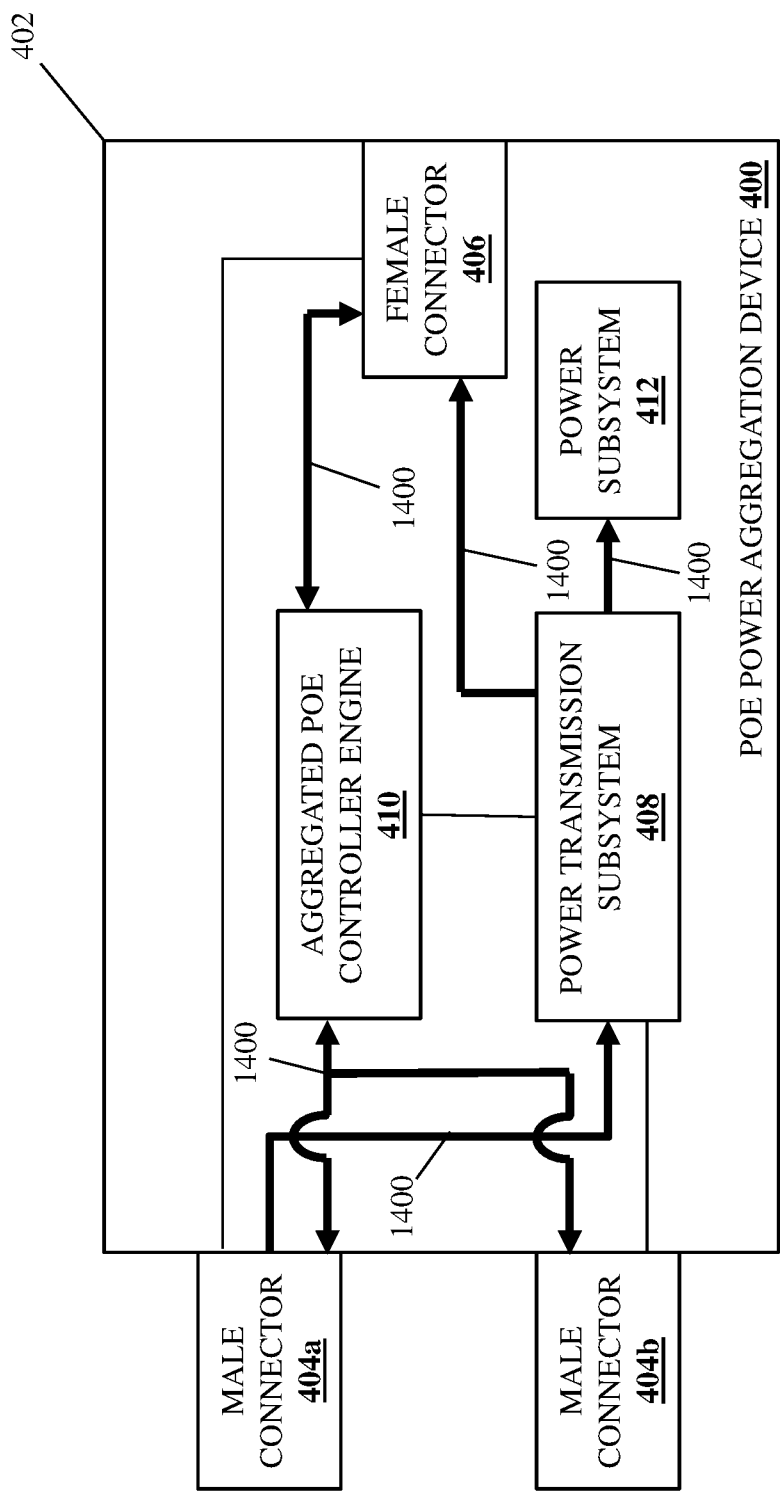
FIG. 14A is a schematic view illustrating an embodiment of the PoE power aggregation device of FIG. 4A operating during the method of FIG. 11.

However, with reference to FIG. 14A, in some embodiments the aggregated PoE controller engine 410 in the PoE power aggregation device 400 may perform aggregated PoE configuration and negotiation operations 1400 in order to configure the powering device 202 for the aggregated PoE functionality described below, as well as negotiate the power that will be provided by the powering device 202 to the powered device 206. For example, the aggregated PoE configuration and negotiation operations 1400 may begin with the powering device 202 providing power via its powering device port 202a, the male connector 404a, and to the power transmission subsystem 408, with a subset of the power received from the powering device 202 at the power transmission subsystem 408 provided to the power subsystem 412 in order to power the PoE power aggregation device 400. The aggregated PoE controller engine 410 may then use PoE negotiation techniques (e.g., like those discussed above between the powering device 202 and the powered device 206) in order to negotiate the provisioning of an amount of power from the powering device 202 that one of skill in the art in possession of the present disclosure will recognize is sufficient to complete the aggregated PoE configuration and negotiation operations 1400 discussed below, determine a maximum amount of power available to the PoE power aggregation device 400 from the powering device 202, as well as any other power details that would be apparent to one of skill in the art in possession of the present disclosure.

The power negotiation operations 1400 may then include the aggregated PoE controller engine 410 using the power transmission subsystem 408 to provide power having an initial voltage via the female connector 406 and to the powered device 206 via its powered device port 206a in order to power the powered device 206. The power negotiation operations 1400 may then include the aggregated PoE controller engine 410 using the power transmission subsystem 408 to provide power having an increased voltage (i.e., relative to the initial voltage discussed above) via the female connector 406 and to the powered device 206 via its powered device port 206a, and one of skill in the art in possession of the present disclosure will appreciate how the provisioning of the power with the increased voltage may allow the aggregated PoE controller engine 410 to determine a class of the powered device 206 via the powered device 206 drawing power according to its class (e.g., a class 4 powered device). The power negotiation operations 1400 may then include the aggregated PoE controller engine 410 providing a type field request via the female connector 406 and to the powered device 206 via its powered device port 206a, and one of skill in the art in possession of the present disclosure will appreciate how the provisioning of the type field request may cause the powered device 206 to respond to the aggregated PoE controller engine 410 with its type (e.g., type 2) via its powered device port 206a and the female connector 406.

Figure 14B:
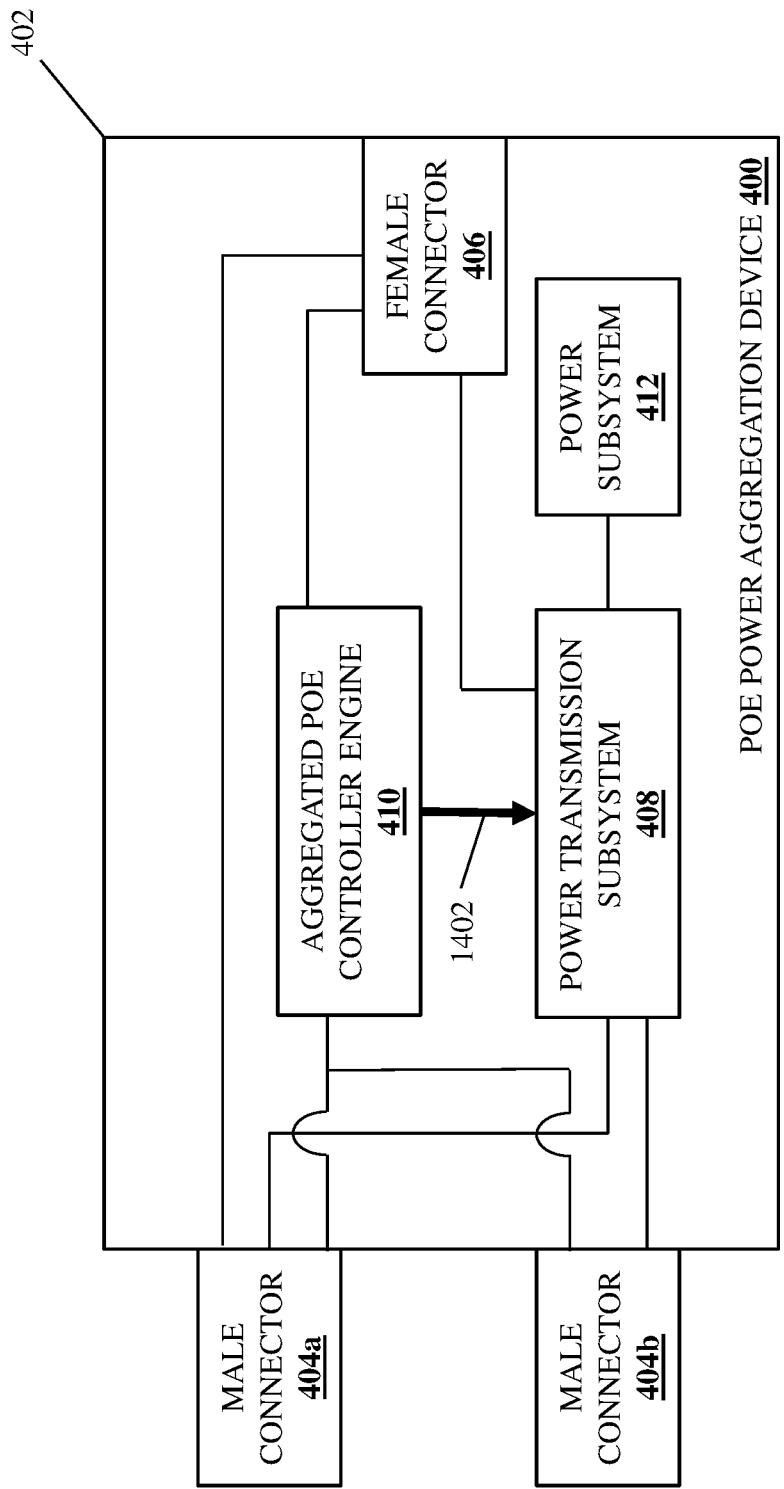
FIG. 14B is a schematic view illustrating the PoE power aggregation device of FIG. 14A operating during the method of FIG. 11.

The power negotiation operations 1400 may then include the aggregated PoE controller engine 410 advertising its available power (e.g., 30 watts based on a maximum 15 watts available from each of the powering devices ports 202a and 202b in a specific example, or any amount reported by or determined via the power negotiations between the PoE power aggregation device 400 and the powering device 202 as described above) via the female connector 406 and to the powered device 206 via its powered device port 206a, and one of skill in the art in possession of the present disclosure will appreciate how the advertisement of the available power may allow the powered device 206 to respond with a requested power (e.g., 25 watts) via its powered device port 206a and the female connector 406. The aggregated PoE controller engine 410 may then use PoE negotiation techniques (e.g., like those discussed above between the powering device 202 and the powered device 206) in order to negotiate the provisioning of the requested power from the powering device 202 to cause the powering device 202 to subsequently transmit that requested power via the powering device ports 202a and 202b. With reference to FIG. 14B, in some embodiments, the aggregated PoE controller engine 410 may then perform power transmission subsystem configuration operations 1402 that may include configuring the power transmission subsystem 408 to use the power received via the powering device connectors 404a and 404b to provide the requested power via the female connector 206.

The method 1100 then proceeds to block 1106 where the PoE power aggregation device receives data from the powering device via a first powering device connector. In an embodiment, at block 1106, the powering device 202 may transmit data via its powering device port 202a (e.g., based on the configuration of the powering device 202 discussed above with reference to block 1104), and that data may be received by the PoE power aggregation device 400 via its male connector 404a.

The method 1100 then proceeds to block 1108 where the PoE power aggregation device receives respective power from the powering device via the plurality of powering device connectors. In an embodiment, at block 1108, the powering device 202 may transmit first power (e.g., 15 watts) via its powering device port 202a (e.g., based on the configuration of the powering device 202 discussed above with reference to block 1104) such that the first power transmitted via the powering device port 202a is transmitted along with at least some of the data transmitted via the powering device port 202a at block 1106, and may transmit second power (e.g., 15 watts) via its powering device port 202b (e.g., based on the configuration of the powering device 202 discussed above with reference to block 1104), with that first and second power received by the PoE power aggregation device 400 via its male connectors 404a and 404b, respectively.

Figure 15:
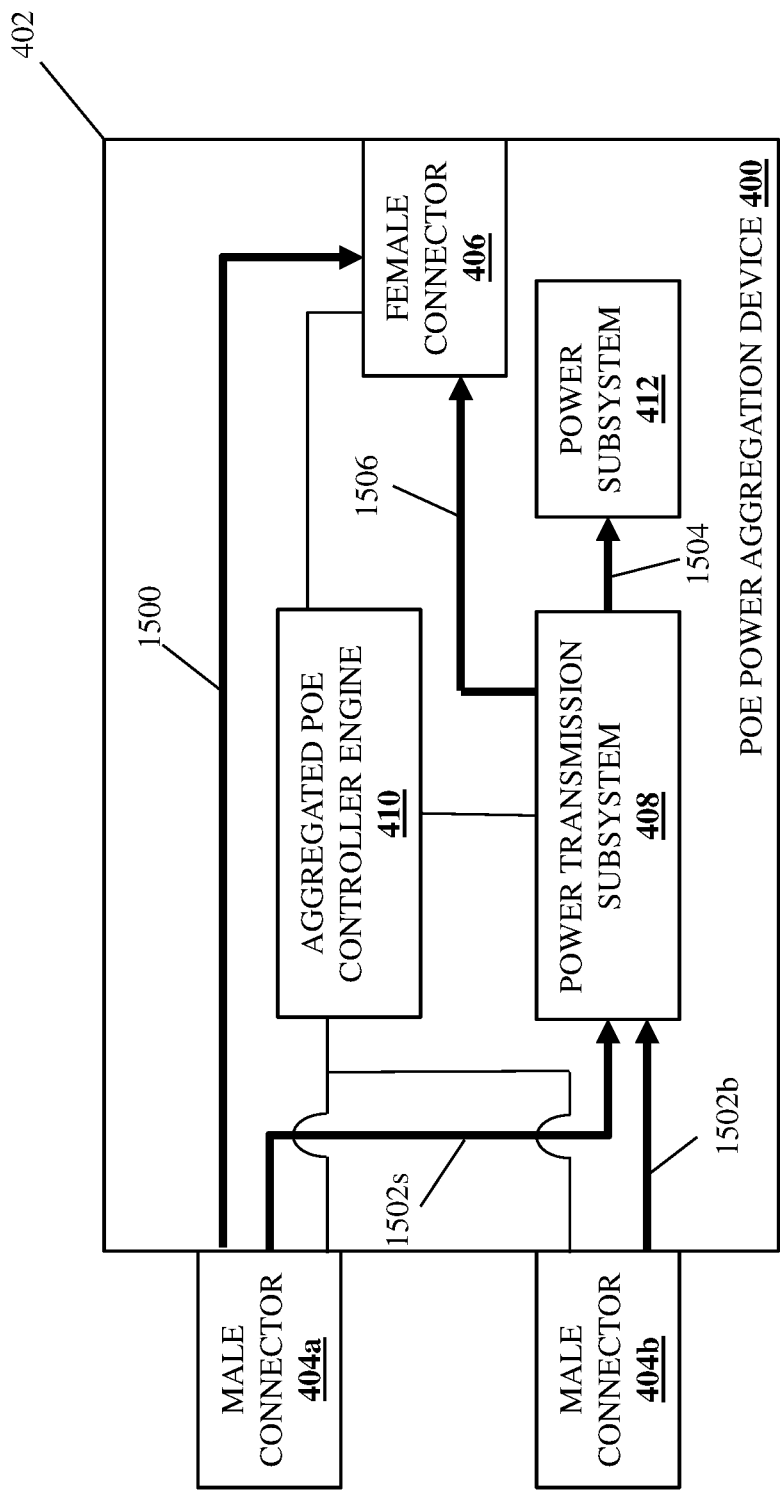
FIG. 15 is a schematic view illustrating the PoE power aggregation device of FIG. 14A operating during the method of FIG. 11.

The method 1100 then proceeds to block 1110 where the PoE power aggregation device transmits the data received via the first powering device connector and the respective power received via the plurality of powering device connectors via the powered device connector to the powered device. With reference to FIG. 15, in an embodiment of block 1110, the PoE power aggregation device 400 may perform data transmission operations 1500 that include transmitting the data received from the powering device 202 via the male connector 404a via the "data passthrough" discussed above and to the female connector 406 such that the data is provided to the powered device port 206a (e.g., via an Ethernet cable) and to the powered device 206.

Furthermore, the PoE power aggregation device 400 may also perform power transmission operations 1502a that include transmitting the first power (e.g., 15 watts) received from the powering device 202 via the male connector 404a to the power transmission subsystem 408, power transmission operations 1502b that include transmitting the second power (e.g., 15 watts) received from the powering device 202 via the male connector 404b to the power transmission subsystem 408, power aggregation operations that include the power transmission system 408 aggregating the first power and second power received via the male connectors 404a and 404b to provide aggregated power (e.g., 30 watts), power transmission operations 1504 that include the power transmission subsystem 408 providing a portion of the aggregated power to the power subsystem 412 for use in powering the PoE power aggregation device 400, and power transmission operations 1506 that include transmitting the requested power (i.e., the 25 watts of power requested by the powered device 206 at block 1104 in the example above) via the female connector 406 such that the requested power is provided to the powered device port 206a (e.g., via an Ethernet cable) and to the powered device 206 for use by the powered device 206 to operate.

Thus, systems and methods have been described that provide for the aggregation of respective power received from multiple powering device ports on a powering device, and the transmission of that respective power along with data received from at least one of those powering device ports to a powered device. For example, the PoE power aggregation system of the present disclosure may include a PoE power aggregation device coupling a powering device to a powered device. The PoE power aggregation device includes first and second powering device connectors coupled to first and second powering device ports on the powering device, respectively, and a powered device connector coupled to a powered device port on the powered device. The PoE power aggregation device receives data from the powering device via the connected first powering device port/first powering device connector, and transmits the data to the powered device through the connected powered device connector/powered device port. The PoE power aggregation device also receives first and second power from the powering device via the connected first powering device port/first powering device connector and the connected second powering device port/second powering device connector, respectively, and transmits the first and second power to the powered device through the connected powered device connector/powered device port along with the data. As such, powering devices may power powered devices that require a power level that exceeds the maximum power available from any one of their powering device ports by aggregating power from a plurality of those powering device ports and providing that aggregated power to that powered device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Power over Ethernet (PoE) power aggregation system, comprising:
 a powering device including a first powering device port and a second powering device port;
 a powered device including a powered device port; and
 a Power over Ethernet (PoE) power aggregation device that includes:
  a PoE power aggregation device chassis;
  a first powering device connector that is included on a first PoE power aggregation device chassis portion of the PoE power aggregation device chassis and that is coupled to the first powering device port included on the powering device;
  a second powering device connector that is included on a second PoE power aggregation device chassis portion of the PoE power aggregation device chassis and that is coupled to the second powering device port included on the powering device;
  a powered device connector that is included on the first PoE power aggregation device chassis portion of the PoE power aggregation device chassis and that is coupled to the powered device port included on the powered device;
  a hinge that moveably couples the first PoE power aggregation device chassis portion of the PoE power aggregation device chassis to the second PoE power aggregation device chassis portion of the PoE power aggregation device chassis and that is configured to move the first powering device connector and the second powering device connector between a side-by-side orientation and a stacked orientation;

a data transmission subsystem that is included in at least one of the first PoE power aggregation device chassis portion and the second PoE power aggregation device chassis portion of the PoE power aggregation device chassis, and that is coupled to the first powering device connector and the first powered device connector, wherein the data transmission subsystem is configured to receive data from the powering device via the first powering device port and through the first powering device connector, and transmit the data to the powered device through the powered device connector and via the powered device port;

an aggregated PoE controller subsystem that is included in at least one of the first PoE power aggregation device chassis portion and the second PoE power aggregation device chassis portion of the PoE power aggregation device chassis, and that is coupled to the first powering device connector, the second powering device connector, and the powered device connector, wherein the aggregated PoE controller subsystem is configured to:

negotiate, with the powering device via at least one of the first powering device connector and the second powering device connector, the provisioning of first power by the powering device through the first powering device connector and the provisioning of second power by the powering device through the second powering device connector; and negotiate, with the powered device via the powered device connector, the provisioning of third power through the powered device connector; and a power transmission subsystem that is included in at least one of the first PoE power aggregation device chassis portion and the second PoE power aggregation device chassis portion of the PoE power aggregation device chassis, and that is coupled to the first powering device connector, the second powering device connector, and the first powered device connector, wherein the power transmission subsystem is configured to receive the first power from the powering device via the first powering device port and through the first powering device connector, receive the second power from the powering device via the second powering device port and through the second powering device connector, and transmit the third power that includes at least some of the first power and the second power to the powered device through the powered device connector and via the powered device port along with the data.

2. The system of claim 1, wherein the first powering device connector is a male Ethernet connector, the second powering device connector is a male Ethernet connector, and the powered device connector is a female Ethernet connector.

3. The system of claim 1, wherein the side-by-side orientation of the first powering device connector and the second powering device connector configures the first powering device connector and the second powering device connector to connect to the first powering device port and the second powering device port in the same row on the powering device, and wherein the stacked orientation of the first powering device connector and the second powering device connector configures the first powering device connector and the second powering device connector to connect to the first powering device port and the second powering device port in adjacent rows on the powering device.

4. The system of claim 3, wherein the stacked orientation of the first powering device connector and the second powering device connector inverts the second powering device connector relative to the first powering device connector.

5. The system of claim 3, wherein the second powering device connector is configured to move through a channel defined by the second PoE power aggregation device chassis portion of the PoE power aggregation device chassis to adjust a distance between the first powering device connector and the second powering device connector.

6. The system of claim 1, wherein the first powering device connector is a female Ethernet connector, the second powering device connector is a female Ethernet connector, and the powered device connector is a female Ethernet connector.

7. A Power over Ethernet (PoE) power aggregation device, comprising:

a chassis;

a first powering device connector that is included on a first portion of the chassis;

a second powering device connector that is included on a second portion of the chassis;

a powered device connector that is included on the first portion of the chassis;

a hinge that moveably couples the first portion of the chassis to the second portion of the chassis and that is configured to move the first powering device connector and the second powering device connector between a side-by-side orientation and a stacked orientation;

a data transmission subsystem that is included in at least one of the first portion and the second portion of the chassis and coupled to the first powering device connector and the first powered device connector, wherein the data transmission subsystem is configured to:

receive data from a powering device through the first powering device connector; and transmit the data to a powered device through the powered device connector;

a processing system that is included in at least one of the first portion and the second portion of the chassis and that is coupled to the first powering device connector, the second powering device connector, and the powered device connector;

a memory system that is included in the chassis, that is coupled to the processing system, and that includes instructions that, when executed by the processing system, cause the processing system to provide an aggregated PoE controller engine that is configured to:

negotiate, with the powering device via at least one of the first powering device connector and the second powering device connector, the provisioning of first power by the powering device through the first powering device connector and the provisioning of second power by the powering device through the second powering device connector; and negotiate, with the powered device via the powered device connector, the provisioning of third power through the powered device connector; and a power transmission subsystem that is included in at least one of the first portion and the second portion of the chassis and coupled to the first powering device connector, the second powering device connector, and the first powered device connector, wherein the power transmission subsystem is configured to:

receive the first power from the powering device through the first powering device connector;
receive the second power from the powering device through the second powering device connector; and
transmit the third power that includes at least some of the first power and the second power to the powered device through the powered device connector along with the data.

8. The PoE power aggregation device of claim 7, wherein the first powering device connector is a male Ethernet connector, the second powering device connector is a male Ethernet connector, and the powered device connector is a female Ethernet connector.

9. The PoE power aggregation device of claim 7, wherein the side-by-side orientation of the first powering device connector and the second powering device connector configures the first powering device connector and the second powering device connector to connect to respective port in the same row on the powering device, and wherein the stacked orientation of the first powering device connector and the second powering device connector configures the first powering device connector and the second powering device connector to connect to respective ports in adjacent rows on the powering device.

10. The PoE power aggregation device of claim 9, wherein the stacked orientation of the first powering device connector and the second powering device connector inverts the second powering device connector relative to the first powering device connector.

11. The PoE power aggregation device of claim 9, wherein the second powering device connector is configured to move through a channel defined by the second portion of the chassis to adjust a distance between the first powering device connector and the second powering device connector.

12. The PoE power aggregation device of claim 7, wherein the first powering device connector is a female Ethernet connector, the second powering device connector is a female Ethernet connector, and the powered device connector is a female Ethernet connector.

13. The PoE power aggregation device of claim 7, wherein the aggregated PoE controller engine is configured to:
configure the power transmission subsystem to use the at least some of the first power received from the powering device via the first powering device connector and the second power received from the powering device via the second powering device connector to provide the third power to the powered device via the powered device connector.

14. A method for aggregating Power over Ethernet (PoE) power from a powering device for use by a powered device, comprising:
moving, by a hinge that couples a first Power over Ethernet (PoE) power aggregation device chassis portion of a PoE power aggregation device to a second PoE power aggregation device chassis portion of the PoE power aggregation device, a first powering device connector included on the first PoE power aggregation device chassis portion of the PoE power aggregation device and a second powering device connector included on the second PoE power aggregation device chassis portion of the PoE power aggregation device between a side-by-side orientation and a stacked orientation;
receiving, by the PoE power aggregation device, data from a powering device through the first powering device connector;
transmitting, by the PoE power aggregation device, the data to a powered device through a powered device connector included on the first PoE power aggregation device chassis of the PoE power aggregation device;
negotiating, by the PoE power aggregation device with the powering device via at least one of the first powering device connector and a second powering device connector, the provisioning of first power by the powering device through the first powering device connector and the provisioning of second power by the powering device through the second powering device connector;
negotiating, by the PoE power aggregation device with the powered device via the powered device connector, the provisioning of third power through the powered device connector;
receiving, by the PoE power aggregation device, the first power from the powering device through the first powering device connector;
receiving, by the PoE power aggregation device, the second power from the powering device through a second powering device connector included on the PoE power aggregation device; and
transmitting, by the PoE power aggregation device, the third power that includes at least some of the first power and the second power to the powered device through the powered device connector along with the data.

15. The method of claim 14, wherein the first powering device connector is a male Ethernet connector, the second powering device connector is a male Ethernet connector, and the powered device connector is a female Ethernet connector.

16. The method of claim 14, wherein the side-by-side orientation of the first powering device connector and the second powering device connector configures the first powering device connector and the second powering device connector to connect to the first powering device port and the second powering device port in the same row on the powering device, and wherein the stacked orientation of the first powering device connector and the second powering device connector configures the first powering device connector and the second powering device connector to connect to the first powering device port and the second powering device port in adjacent rows on the powering device.

17. The method of claim 16, wherein the stacked orientation of the first powering device connector and the second powering device connector inverts the second powering device connector relative to the first powering device connector.

18. The method of claim 16, wherein the second powering device connector is moved through a channel defined by the second PoE power aggregation device chassis portion of the PoE power aggregation device to adjust a distance between the first powering device connector and the second powering device connector.

19. The method of claim 14, wherein the first powering device connector is a female Ethernet connector, the second powering device connector is a female Ethernet connector, and the powered device connector is a female Ethernet connector.

20. The method of claim 14, wherein the negotiating of the provisioning of third power through the powered device connector by the PoE power aggregation device with the powered device includes determining a class and a type of the powered device.

* * * * *